(12) United States Patent
Manabe et al.

(10) Patent No.: US 8,640,489 B2
(45) Date of Patent: Feb. 4, 2014

(54) HEAT PUMP

(75) Inventors: Toshio Manabe, Kawasaki (JP); Hiroaki Yoshida, Kawasaki (JP); Fumio Takei, Kawasaki (JP); Noriyasu Aso, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 13/198,961

(22) Filed: Aug. 5, 2011

(65) Prior Publication Data

US 2011/0283736 A1 Nov. 24, 2011

Related U.S. Application Data

(63) Continuation of application No. PCT/JP2010/001080, filed on Feb. 19, 2010.

(30) Foreign Application Priority Data

Feb. 19, 2009 (JP) .................................. 2009-036783

(51) Int. Cl.
*F25B 15/00* (2006.01)

(52) U.S. Cl.
USPC ............................................. 62/476; 62/482

(58) Field of Classification Search
USPC ........... 62/503, 509, 113, 513, 476, 434, 482, 62/484, 487
See application file for complete search history.

(56) References Cited

U.S. PATENT DOCUMENTS

| 5,477,705 A | 12/1995 | Meunier |
| 6,615,603 B2 | 9/2003 | Tanaka |

FOREIGN PATENT DOCUMENTS

| EP | 1 363 085 A1 | 11/2003 |
| JP | 01-130728 | 5/1989 |
| JP | 01-256794 | 10/1989 |
| JP | 05-52446 | 3/1993 |
| JP | 05-272832 | 10/1993 |
| JP | 7-120100 | 5/1995 |
| JP | 11-223411 | 8/1999 |
| JP | 2002-100891 A1 | 4/2002 |
| JP | 2003-340236 A1 | 12/2003 |

OTHER PUBLICATIONS

Notification of Reason for Refusal mailed Dec. 18, 2012 in counterpart application No. 2011-500523 with English translation.
International Search Report for International Application No. PCT/JP2010/001080 dated Apr. 5, 2010.

*Primary Examiner* — Mohammad M Ali

(74) *Attorney, Agent, or Firm* — Kratz, Quintos & Hanson, LLP

(57) ABSTRACT

A heat pump including: a refrigerant accumulator in which a substance accumulating a refrigerant is disposed, the refrigerant accumulator having a heating means heating the substance in order to release the refrigerant; a flow path connected at one end thereof to the refrigerant accumulator, the flow path holding the refrigerant released from the substance in the refrigerant accumulator by capillary action; a first heat exchanger provided between the refrigerant accumulator and the flow path or around the flow path and exchanging heat with the refrigerant in order to condense the refrigerant; and a second heat exchanger provided around the flow path and exchanging cold energy generated by evaporation of the refrigerant from the other end of the flow path.

9 Claims, 17 Drawing Sheets

HEAT PUMP

CROSS-REFERENCE TO RELATED APPLICATIONS

This is a continuation of Application No. PCT/JP2010/001080 filed on Feb. 19, 2010 which claims the benefit of priority from Japanese Patent Application No. 2009-36783, filed on Feb. 19, 2009, the entire contents of which are incorporated herein by reference.

FIELD

The embodiment discussed herein is related to a heat pump that converts thermal energy into cold energy using the transfer of latent heat accompanying a phase change of a refrigerant.

BACKGROUND

Recently, the importance of development of technologies for reduction of environmental burdens, such as prevention of global warming and conservation of energy resources, has increased rapidly. Among them, technologies to recover and reuse waste heat that has been considered to be useless and discarded are attracting attention.

One of them is an adsorption heat pump. An adsorption heat pump is a technique to convert low-grade thermal energy at 100° C. or lower into useful cold energy by using the transfer of latent heat accompanying the adsorption and desorption of an adsorbate (for example, water or methanol) to and from an adsorbent (for example, silica gel or activated carbon). The temperature at the time of desorption is a relatively low temperature of about 60° C. in some adsorbents. For this reason, as a technology capable of recovering energy from various types of low-temperature waste heat, many researches have been made on adsorption heat pump.

An adsorption heat pump has a condenser and an evaporator. Adsorbate serves as a working medium that transfers heat. After desorbing from adsorbent, adsorbate is cooled in the condenser and undergoes a phase change from vapor to liquid. Liquid adsorbate is sent to the evaporator, which transfers cold energy to the outside. The evaporator generates cold energy by vaporizing liquid adsorbate. The condenser and the evaporator do not necessarily have optimum structure from the viewpoint of efficiency and size. For example, in order to prevent backflow of vapor from the evaporator to the condenser, extra liquid adsorbate is often stored between the evaporator and the condenser so that water blocks the flow path. In order to prevent cold energy from being lost through the flow path, the condenser and the evaporator are often connected by a long tube and disposed at a distance from each other. For these reasons, heat pumps tend to be large. Liquid adsorbate stored in the vicinity of the evaporator in order to pass cold energy to a heat exchanger may bump and spatter under reduced pressure. If spattered drops of water attach to a wall or the like, cold energy is lost and the heat exchange efficiency decreases. Owing to the size of adsorption heat pumps and the difficulty of increasing efficiency, the use of adsorption heat pumps is limited.

The followings are reference documents:
[Document 1] Japanese Laid-open Patent Publication No. 05-272832
[Document 2] Japanese Laid-open Patent Publication No. 2002-100891
[Document 3] Japanese Laid-open Patent Publication No. 05-52446

SUMMARY

According to an aspect of the embodiment, a heat pump includes: a refrigerant accumulator in which a substance accumulating a refrigerant is disposed, the refrigerant accumulator having a heating means heating the substance in order to release the refrigerant; a flow path connected at one end thereof to the refrigerant accumulator, the flow path holding the refrigerant released from the substance in the refrigerant accumulator by capillary action; a first heat exchanger provided between the refrigerant accumulator and the flow path or around the flow path and exchanging heat with the refrigerant in order to condense the refrigerant; and a second heat exchanger provided around the flow path and exchanging cold energy generated by evaporation of the refrigerant from the other end of the flow path.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
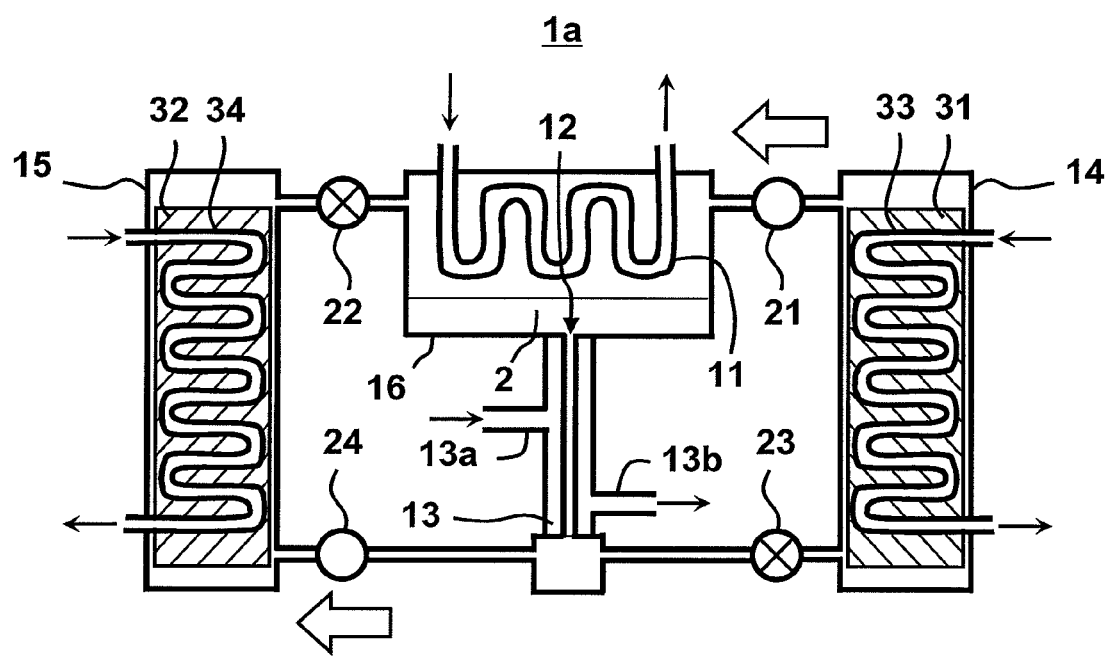
FIG. 1 is a schematic sectional view illustrating a heat pump of a first embodiment.

FIG. 1 is a schematic sectional view illustrating a heat pump of a first embodiment. The heat pump illustrated in FIG. 1 is called adsorption heat pump. In an adsorption heat pump, adsorbent and adsorbate (refrigerant) capable of being vaporized and adsorbed to and desorbed from the adsorbent are enclosed in a depressurized container. Owing to the adsorption of gaseous adsorbate to adsorbent, the vapor pressure of adsorbate in an atmosphere decreases, and liquid adsorbate is vaporized. At the time of this vaporization, heat is taken from the adsorbate, and therefore cold energy may be taken out by keeping liquid adsorbate and a heat exchanger in contact. Next, the adsorbate adsorbed to adsorbent is desorbed by heating using warm heat. The desorbed adsorbate is condensed and returned to liquid by cooling using cooling water or the like. By repeating the above adsorption and desorption processes, cold energy may be generated from warm heat.

The adsorption heat pump 1a illustrated in FIG. 1 includes a first heat exchanger 11 capable of condensing gaseous adsorbate to liquid, a first flow path 12 that holds the adsorbate condensed in the first heat exchanger 11 by capillary action, a second heat exchanger 13 that transfers cold energy from the first flow path 12, and two adsorbers 14 and 15 connected to both ends of the first flow path. The first heat exchanger 11 is provided in a condensing chamber 16 provided between the first flow path 12 and the adsorber 14. Between the condensing chamber 16 and the adsorbers 14 and 15, valves 21 and 22 are provided that open and close the spaces between the condensing chamber 16 and the adsorbers 14 and 15. Between the end of the first flow path 12 opposite to the condensing chamber 16 and the adsorbers 14 and 15, valves 23 and 24 are provided that open and close the space. The condensing chamber 16, first flow path 12, and adsorbers 14 and 15 have a hermetically-sealed space therein. When the adsorption heat pump is in use, this space is depressurized.

The adsorbers 14 and 15 are provided with tubular members 33 and 34, respectively, through which liquid may be caused to flow. Around the tubular members 33 and 34, adsorbents 31 and 32, respectively, are disposed.

The adsorbents 31 and 32 are materials capable of adsorbing and desorbing adsorbate under the atmosphere of the adsorbers 14 and 15. On the surfaces of the adsorbents 31 and 32, desorption of adsorbate occurs dominantly at a given temperature or above, and adsorption occurs dominantly below the temperature. For example, when the adsorbate is water, silica gel, zeolite, activated carbon or the like is used as the adsorbents 31 and 32. When the adsorbate is alcohol such as methanol or ethanol, activated carbon is used as the adsorbents 31 and 32. The temperature required to desorb adsorbate from the surfaces of these adsorbents 31 and 32 is about 60° C. These adsorbents are preferably used to recover energy from waste heat at a relatively low temperature, for example, of 100° C. or lower.

The tubular members 33 and 34 are provided as means for controlling the temperatures of the adsorbents 31 and 32. A first fluid is a heat transfer medium for controlling to a temperature at which desorption of adsorbate from the adsorbents 31 and 32 is dominant. A second fluid is a heat transfer medium for controlling to a temperature at which adsorption of adsorbate to the adsorbents 31 and 32 is dominant. One of the first and second fluids is selectively caused to flow through the tubular members 33 and 34. The first fluid transfers, for example, heat generated from a waste heat source and heats adsorbent. After heating the adsorbent, the first fluid generally flows back and forth between the vicinity of the waste heat source and the vicinity of the adsorbent. The second fluid is, for example, tap water and cools adsorbent. After cooling the adsorbent, the second fluid may be drained or may be cooled in an outdoor unit and caused to flow back and forth between the outdoor unit and the vicinity of the adsorbent. Although the type of the first fluid and the second fluid is not particularly limited, water, which is high in heat capacity and heat conductivity, is preferably used. Although the tubular members 33 and 34 are tubular in FIG. 1, instead, members having any shape may be used as long as they have function to exchange heat with the adsorbents 31 and 32. For example, the outer and inner shapes of the tubular members are not limited to a cylindrical shape, and may be a square tubular shape.

In FIG. 1, the valves 21 and 24 are open, and the valves 22 and 23 are closed. The initial state will be defined as a state where adsorbate is desorbed from the adsorbent 31 and adsorbate is adsorbed to the adsorbent 32. At this time, by causing the first fluid storing heat generated from the waste heat source to flow through the tubular member 33, the adsorbent 31 is heated, and adsorbate is desorbed from the adsorbent 31. On the other hand, by causing the second fluid to flow through the tubular member 34 so that the adsorption to adsorbent is dominant, adsorbate is adsorbed to the adsorbent 32.

The first heat exchanger 11 is a cooling device for causing the gaseous adsorbate desorbed from adsorbent to undergo a phase change to liquid. The first heat exchanger 11 is provided in the condensing chamber 16. In FIG. 1, gaseous adsorbate generated from the adsorber 14 flows through the valve 21 into the condensing chamber 16. After flowing into the condensing chamber 16, the adsorbate is cooled by the first heat exchanger 11 and undergoes a phase change to liquid. The liquid adsorbate 2 accumulates in the lower part of the condensing chamber 16. The first heat exchanger 11 is, for example, a flow path for liquid (hereinafter this flow path for liquid adsorbate will also be referred to as second flow path). This flow path is composed, for example, of a tubular member. By causing a third fluid at a temperature lower than the condensing point of the adsorbate to flow through this tubular member, as a heat transfer medium, the adsorbate may be condensed on the surface of the tubular member. Although the first heat exchanger 11 is tubular in FIG. 1, the shape of the first heat exchanger 11 is not particularly limited. For example, the outer and inner shapes of the first heat exchanger 11 are not limited to a cylindrical shape, and may be a square tubular shape.

The first flow path 12 may hold the adsorbate sent from one end thereof by capillary action. One end of the first flow path 12 is connected through the condensing chamber 16 to the adsorbers 14 and 15. In FIG. 1, the liquid adsorbate 2 accumulated in the lower part of the condensing chamber 16 flows into the first flow path 12 by capillary action and is held in the first flow path 12.

Whether or not capillary action occurs is determined by the material of which the inside of the first flow path 12 is made, the shape of the first flow path 12, the type of the adsorbate, and so forth. For example, when the adsorbate is water and the inside of the first flow path 12 is made of stainless and is tubular, capillary action occurs when the diameter of the first flow path is 0.01 to 1 mm.

The occurrence of capillary action may be confirmed, for example, by the fact that when the liquid surface of the adsorbate and one end of the first flow path 12 are brought into contact with each other, the adsorbate flows into the first flow path 12. If the first flow path 12 has a shape extending in one direction, the occurrence of capillary action may be confirmed by the fact that when the direction in which the first flow path 12 with adsorbate therein extends is parallel to the direction of gravitational force, the adsorbate does not leak from the lower end of the first flow path 12.

The liquid adsorbate held in the first flow path 12 vaporizes from the end of the first flow path 12 opposite to the end connected to the condensing chamber 16, and generates cold energy. The vaporization of liquid adsorbate occurs as follows. The adsorbent 32 from which adsorbate is desorbed adsorbs gaseous adsorbate, and thereby the partial pressure of adsorbate in an atmosphere between the adsorber 15 and the first flow path 12 is decreased. Therefore, the gas-liquid equilibrium of adsorbate between the atmosphere and the adsorbate 2 held in the flow path 12 moves to the gas side. Therefore, the liquid adsorbate held in the flow path 12 vaporizes from the end of the flow path opposite to the end connected to the condensing chamber 16.

Although the shape of the first flow path 12 is not particularly limited, the first flow path 12 may be composed, for example, of a tubular member. A first flow path 12 composed of a tubular member is preferable because the efficiency of transferring generated cold energy to the second heat exchanger 13 is high. The outer and inner shapes of the first flow path 12 may be, for example, a square tubular shape.

The first flow path 12 may be composed, for example, of pores of a porous body filling a tubular member. A porous body is easier to handle and process than a thin tubular member capable of holding adsorbate therein by capillary action. Since capillary action occurs owing to the pores of the porous body, the shape and size of the tubular member may be set arbitrarily.

The adsorbate held in the first flow path 12 by capillary action vaporizes from the end of the first flow path 12 opposite to the end connected to the condensing chamber 16, thereby generating cold energy. The second heat exchanger 13 is provided in order to transfer the cold energy to the outside. The second heat exchanger 13 is provided on the first flow path 12 side.

Figure 2:
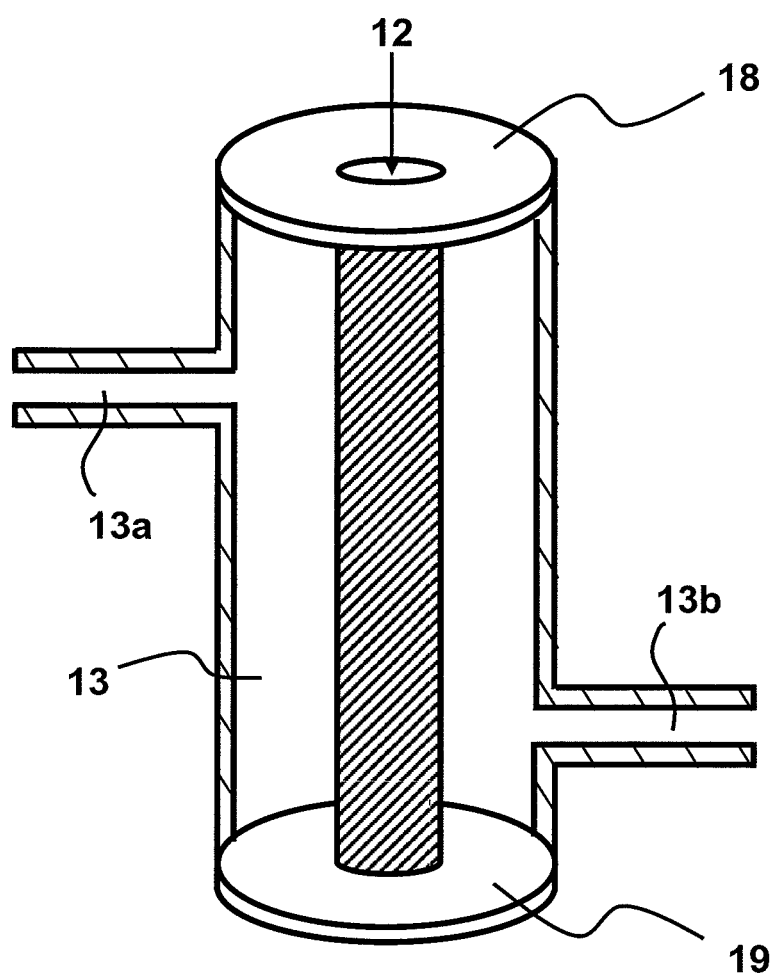
FIG. 2 is an enlarged perspective view of a part of the heat pump of the first embodiment.

FIG. 2 is an enlarged perspective view of the first flow path 12 composed of tubular member, and the second heat exchanger 13 of the heat pump of the first embodiment. In FIG. 2, a part of the outer wall of the second heat exchanger 13 is omitted. The first flow path 12 composed of a tubular member is provided, for example, in the case-like second heat exchanger 13 having an inlet 13a and an outlet 13b. The first flow path 12 and the inside of the second heat exchanger 13 are prevented from communicating with each other. In other words, the second heat exchanger 13 is a flow path provided so as to surround the first flow path 12 (hereinafter this flow path will be referred to as third flow path), and the inside of the first flow path 12 composed of a tubular member and the inside of the second heat exchanger 13 are prevented from communicating with each other by partitions 18 and 19. By causing a liquid (hereinafter this liquid will be referred to as fourth fluid) to flow through this third flow path, as a heat transfer medium, the cold energy generated at the end of the first flow path 12 may be transferred to the outside. This fourth fluid flows through the inlet 13a into the third flow path 13, and flows out of the third flow path 13 through the outlet 13b. The cold energy transferred through the outlet 13b to the outside by this fourth fluid is used, for example, for cooling. The fourth fluid used for cooling is generally returned to the second heat exchanger 13. Although the second heat exchanger 13 is tubular in FIG. 2, the shape of the second heat exchanger 13 is not particularly limited. For example, the outer and inner shapes of the second heat exchanger 13 are not limited to a cylindrical shape, and may be a square tubular shape.

Figure 3:
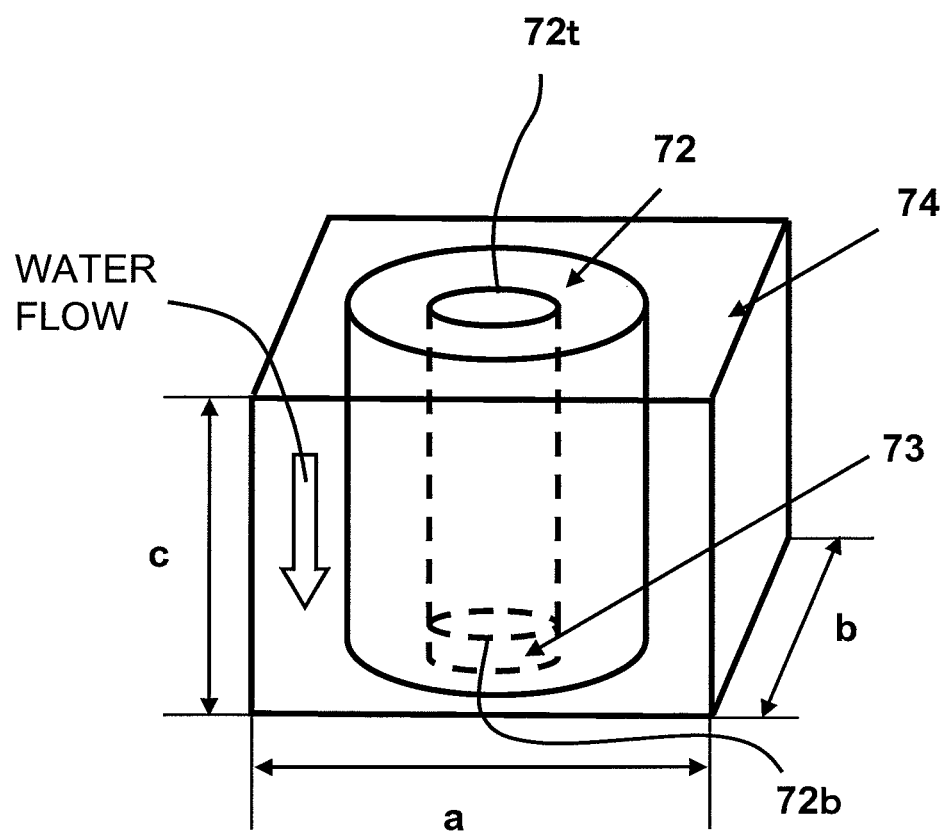
FIG. 3 is a perspective view illustrating conditions of simulations using a capillary tube and the second heat exchanger.

Simulations were conducted to examine whether efficient heat exchange could be performed using the above-described capillary tube and second heat exchanger. The simulation conditions were as follows. As illustrated in FIG. 3, a cold energy source 73 was placed at the lower end of a stainless capillary tube 72 having a diameter of 0.3 mm, a wall thickness of 0.1 mm (an inside diameter of 0.1 mm), and a length of 200 mm, and water was caused to flow downward through a region between the outside of the capillary tube 72 and a rectangular solid surrounding the capillary tube 72 (the length of two sides a and b in the radial direction of the capillary tube is 0.6 mm, and the length of side c in the longitudinal direction is 200 mm). Under these conditions, it was examined which was larger, the amount of heat loss through the capillary tube 72 or the amount of heat recovery by the external water flow. It was assumed that water was held in the capillary tube 72 without flowing. The capillary tube 72 was filled with water. The environmental temperature was 30° C. By reference to the cold energy output per unit area obtained from existing evaporators, the cold energy output of the cold energy source 73 was set to $-7.8 \times 10^{-5}$ W and $-1.0 \times 10^{-2}$ W. The flow rate of the external water flow was changed from 0.000001 to 1 m/s.

Figure 4A:
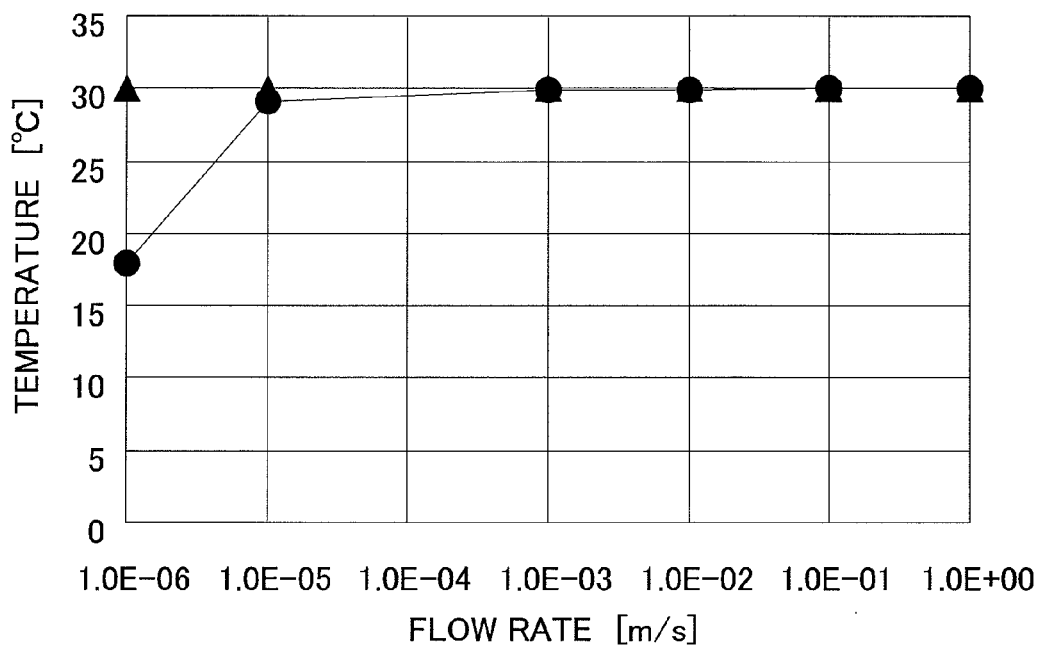
FIGS. 4A and 4B are graphs illustrating the results of the above-described simulations.
Figure 4B:
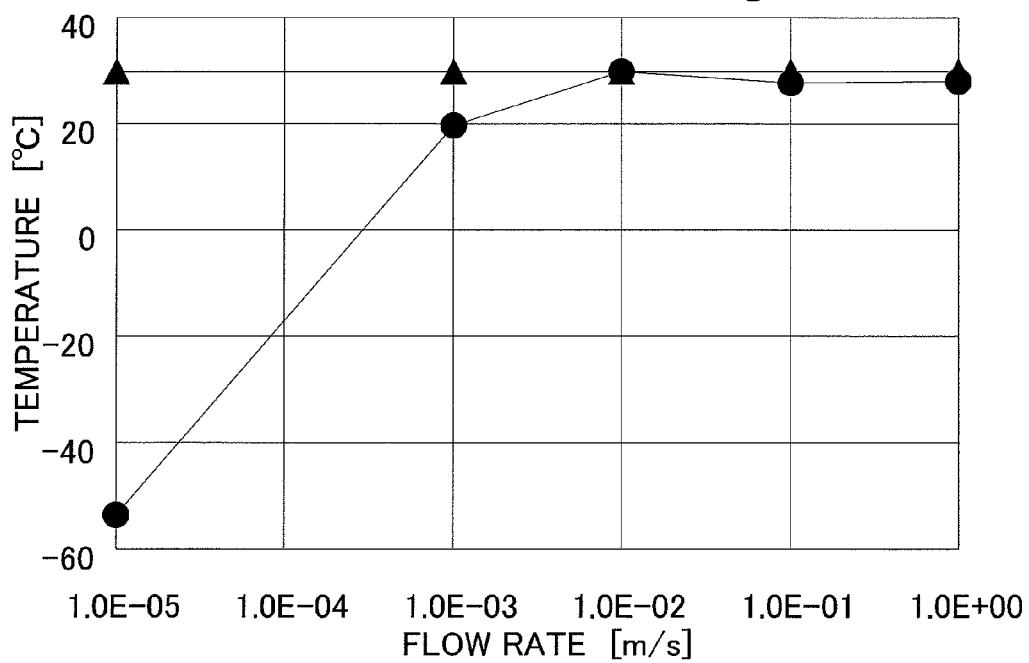

FIGS. 4A and 4B are graphs illustrating the results of the above-described simulations. FIGS. 4A and 4B are graphs illustrating the relationship between the flow rate (m/s) of the external water flow and the temperature (° C.) in the upper part 72t and the lower part 72b of the capillary tube when the cold energy output of the cold energy source 73 is $-7.8 \times 10^{-5}$ W and $-1.0 \times 10^{-2}$ W, respectively. In both the case where the cold energy output was $-7.8 \times 10^{-5}$ W and the case where the cold energy output was $-1.0 \times 10^{-2}$ W, the temperature of the upper part 72t of the capillary tube did not change. The temperature of the lower part 72b of the capillary tube in contact with the cold energy source 73 was made equal to the environmental temperature by causing the external water flow to flow at a flow rate of about 1 cm/s. This shows that almost all of the cold energy generated in the cold energy source 73 is recovered by the external water flow before reaching the upper part through the capillary tube 72. This confirms that the above-described heat pump using a capillary tube and the second heat exchanger may efficiently transfer cold energy to the outside.

The method for manufacturing the heat pump of the first embodiment is not particularly limited. The first heat exchanger 11, the first flow path 12, the second heat exchanger 13, and the partitions 18 and 19 may be formed using a commercially available tube, plate, or bulk material by a general processing method such as cutting, deformation, welding, brazing, or adhesion using a resin adhesive. The adsorbers 14 and 15, and the condensing chamber 16 may also be formed using a commercially available material by a general processing method such as cutting, deformation, welding, or brazing. When the first flow path 12 is formed of resin, the partition 18 may be formed of an adhesive insoluble in adsorbate. When the first flow path 12 is formed of metal, the partition 18 may be formed by welding, brazing, or the like. The partition 18 may double as the outer wall of the condensing chamber 16.

The operation procedure of the heat pump of the first embodiment is not particularly limited. For example, the initial state will be defined as a state where adsorbate is adsorbed to the adsorbent 31 and adsorbate is desorbed from the adsorbent 32. In this state, the first fluid is transferred to the tubular member 33, and the second fluid is transferred to the tubular member 34. The valves 21 and 24 are open, and the valves 22 and 23 are closed. In the adsorber 14, the adsorbent 31 desorbs adsorbate (hereinafter referred to as desorption process). In the adsorber 15, the adsorbent 32 adsorbs adsorbate (hereinafter referred to as adsorption process). Therefore, as described above, cold energy may be transferred from the second heat exchanger 13 to the outside.

With time, adsorbate capable of being desorbed from the adsorbent 31 decreases and the supply of adsorbate to the first flow path 12 decreases. On the other hand, the adsorption capability of the adsorbent 32 decreases. At the end of the first flow path 12, vaporization of adsorbate becomes less likely to occur, and cold energy becomes less likely to be generated. In this state, the second fluid is transferred to the tubular member 33, and the first fluid is transferred to the tubular member 34. The valves 22 and 23 are open, and the valves 21 and 24 are closed. The desorption process progresses in the adsorber 15, and the adsorption process progresses in the adsorber 14. Therefore, as described above, cold energy may be transferred from the second heat exchanger 13 to the outside.

The desorption process and the adsorption process may be performed in a stepwise manner. For example, by causing the first fluid to flow through the tubular members 33 and 34 with the adsorbents 31 and 32 adsorbing adsorbate, opening the valves 21 and 22, and closing the valves 23 and 24, the desorption process is performed in both of the adsorbers 14 and 15. When the amount of adsorbate adsorbed to the adsorbent 31 and 32 becomes small (that is, when the amount of adsorbate condensed in the condensing chamber 16 becomes small), the valves 21 and 22 are closed, the valves 23 and 24 are opened, and the adsorption process is performed in both of the adsorbers 14 and 15. In this state, cold energy may be transferred from the second heat exchanger 13 to the outside.

In the heat pump of the first embodiment, two adsorbers 14 and 15 are used. However, the number of the adsorbers (refrigerant accumulators) may be one, or three or more.

As with the first embodiment, the operation procedures of the heat pumps of second to fifth embodiments to be described below are not particularly limited.

In the heat pump of the first embodiment, it is not necessary to dispose the first heat exchanger and the second heat exchanger at a distance from each other in order to prevent heat exchange there between, and therefore the heat pump of the first embodiment may be reduced in size. Since the second heat exchanger is provided so as to surround the first flow path, the contact area between the liquid adsorbate held in the first flow path and the second heat exchanger may be increased. Since the temperature variation of the liquid adsorbate held in the first flow path is small, bumping may be prevented. Therefore, the heat exchange efficiency is improved.

Because of structure, the contact area between adsorbate and the second heat exchanger may be increased, and therefore a pump for spraying liquid adsorbate onto the second heat exchanger and thereby improving the heat exchange efficiency is unnecessary. Since the structure is simple and an extra drive mechanism is unnecessary, the heat pump of the first embodiment may be reduced in size.

Figure 5:
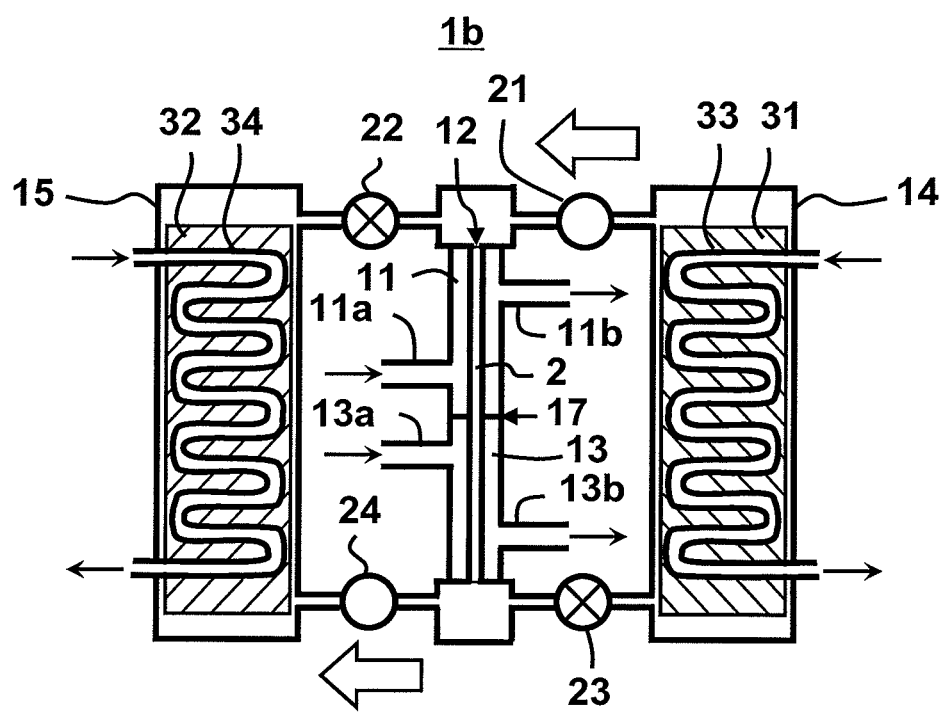
FIG. 5 is a schematic sectional view illustrating a heat pump of a second embodiment.
Figure 6:
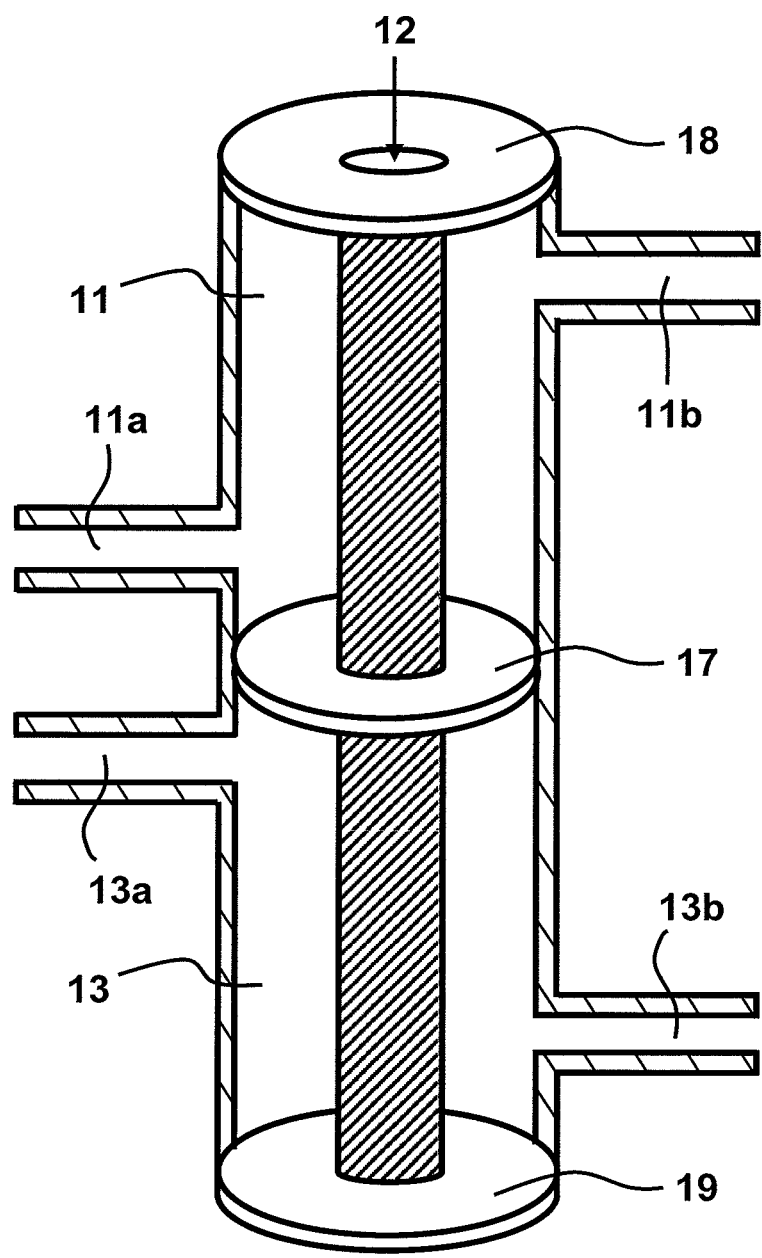
FIG. 6 is an enlarged perspective view of a part of the heat pump illustrated in FIG. 5.

FIG. 5 is a schematic sectional view illustrating a heat pump 1b of a second embodiment. FIG. 6 is an enlarged perspective view of a first flow path 12 composed of a tubular member, a second flow path 11, and a third flow path 13 of the heat pump 1b illustrated in FIG. 5. In FIG. 6, a part of the outer wall of the second heat exchanger 13 is omitted. In the following description, the description of the same components as those of the heat pump 1a of the first embodiment will be omitted.

In FIGS. 5 and 6, the first heat exchanger 11 is provided around the first flow path 12. The first flow path 12 composed of a tubular member is provided, for example, in the case-like first heat exchanger 11 having an inlet 11a and an outlet 11b and the case-like second heat exchanger 13 having an inlet 13a and an outlet 13b. The first flow path 12, the inside of the first heat exchanger 11, and the inside of the second heat exchanger 13 are prevented from communicating with each other. In other words, the first heat exchanger 11 and the second heat exchanger 13 are provided with a second flow path (hereinafter also referred to as second flow path 11) and a third flow path (hereinafter also referred to as third flow path 13), respectively, through which fluid may be caused to flow. Between the first heat exchanger 11 and the second heat exchanger 13, a partition 17 is provided so that a third fluid and a fourth fluid caused to flow through the second flow path 11 and the third flow path 13, respectively, are not mixed. The first flow path 12 is not separated by the partition 17, and the first heat exchanger 11 side and the second heat exchanger 13 side of the first flow path 12 communicate with each other. The inside of the first flow path 12 and the inside of the first heat exchanger 11 are prevented from communicating with each other by the partition 18, and the inside of the first flow path 12 and the inside of the second heat exchanger 13 are prevented from communicating with each other by the partition 19. The third fluid flows into the second flow path 11 through the inlet 11a, and then flows out of the second flow path 11 through the outlet 11b. The fourth fluid flows into the third flow path 13 through the inlet 13a, and then flows out of the third flow path 13 through the outlet 13b.

When the third fluid flows through the second flow path 11, the temperature of the first flow path 12 is maintained lower than the condensing point of adsorbate. Adsorbate flowing from the adsorber 14 or 15 into the first flow path 12 undergoes a phase change from gas to liquid in the first flow path 12 and is held in the state of liquid in the first flow path. In the heat pump 1b of the second embodiment capable of condensing adsorbate in the first flow path 12 as described above, a condensing chamber in which condensed adsorbate is accumulated is not independently provided between the adsorbers 14 and 15 and the first flow path 12. The inside of the first flow path 12 functions as a condensing chamber. The first flow path 12, the first heat exchanger 11, and the second heat exchanger 13 are integrated. Therefore, the size of the heat pump may be further reduced. In addition, as with the heat pump is of the first embodiment, the heat pump 1b of the second embodiment also has improved heat exchange efficiency.

The flow of liquid adsorbate in the first flow path 12 may be caused by the weight of the liquid, or may be caused by the fact that the pressure of the atmosphere at the second heat exchanger side end of the first flow path 12 is lower than the pressure of the atmosphere at the first heat exchanger side end of the first flow path 12. In the heat pump of the above-described embodiment depicted in FIGS. 5 and 6, the first flow path 12 is disposed so that the moving direction of liquid adsorbate held in the first channel 12 is vertical. However, in the heat pump of the present invention, the first flow path may be disposed, for example, so that the moving direction of liquid adsorbate held therein is horizontal.

As with that of the first embodiment, the method for manufacturing the heat pump of the second embodiment is not particularly limited. The heat pump of the second embodiment may be formed by a general processing method.

Figure 7:
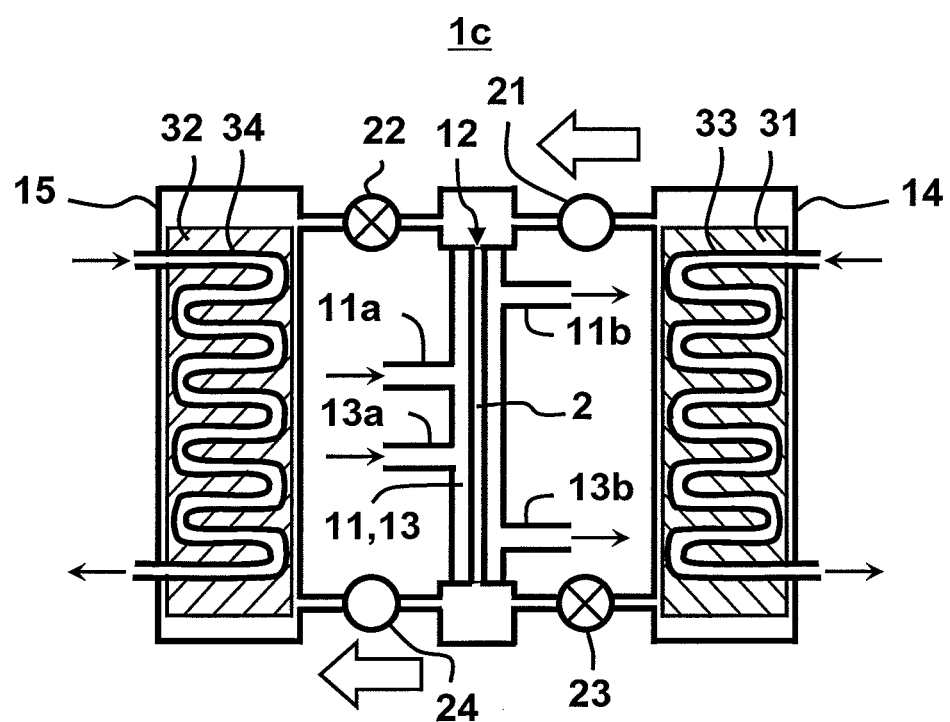
FIG. 7 is a schematic sectional view illustrating a heat pump of a modification of the second embodiment.
Figure 8:
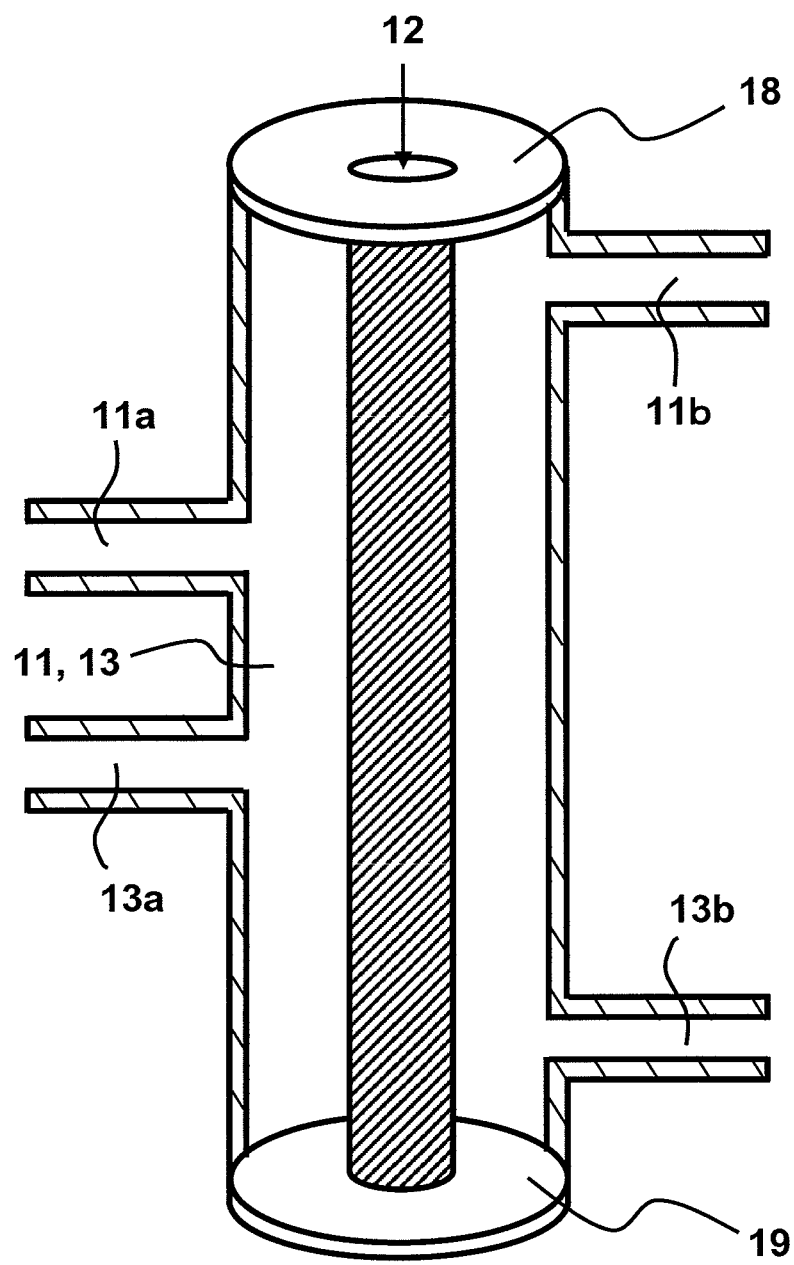
FIG. 8 is an enlarged perspective view of a part of the heat pump illustrated in FIG. 7.

FIG. 7 is a schematic sectional view illustrating a heat pump is of a modification of the second embodiment. FIG. 8 is an enlarged perspective view of a first flow path 12 composed of a tubular member, a second flow path 11, and a third flow path 13 of the heat pump is illustrated in FIG. 7. In the following description, the description of the same components as those of the heat pump 1b of the second embodiment will be omitted. In FIG. 8, a part of the outer wall of the second heat exchanger 13 is omitted.

In the heat pump 1c illustrated in FIG. 7, a partition is not provided between the first heat exchanger 11 and the second heat exchanger 13, and therefore there is no boundary between the second flow path and the third flow path. Therefore, the third fluid flowing in through the inlet 11a and the fourth fluid flowing in through the inlet 13a are mixed in the second flow path 11 and the third flow path 13. Since the temperature of the third fluid is generally higher than that of the fourth fluid, the third fluid tends to move upward in the second flow path 11 and the third flow path 13. On the other hand, since the temperature of the fourth fluid is lower than that of the third fluid, the fourth fluid tends to move downward in the second flow path 11 and the third flow path 13. Therefore, mainly the third fluid flows out through the outlet 11b, and mainly the fourth fluid flows out through the outlet 13b. For the above reason, the heat pump is illustrated in FIG. 7 is inferior to the heat pump 1b of the second embodiment illustrated in FIG. 5 in heat exchange efficiency but superior in that it may be reduced in size.

Figure 9:
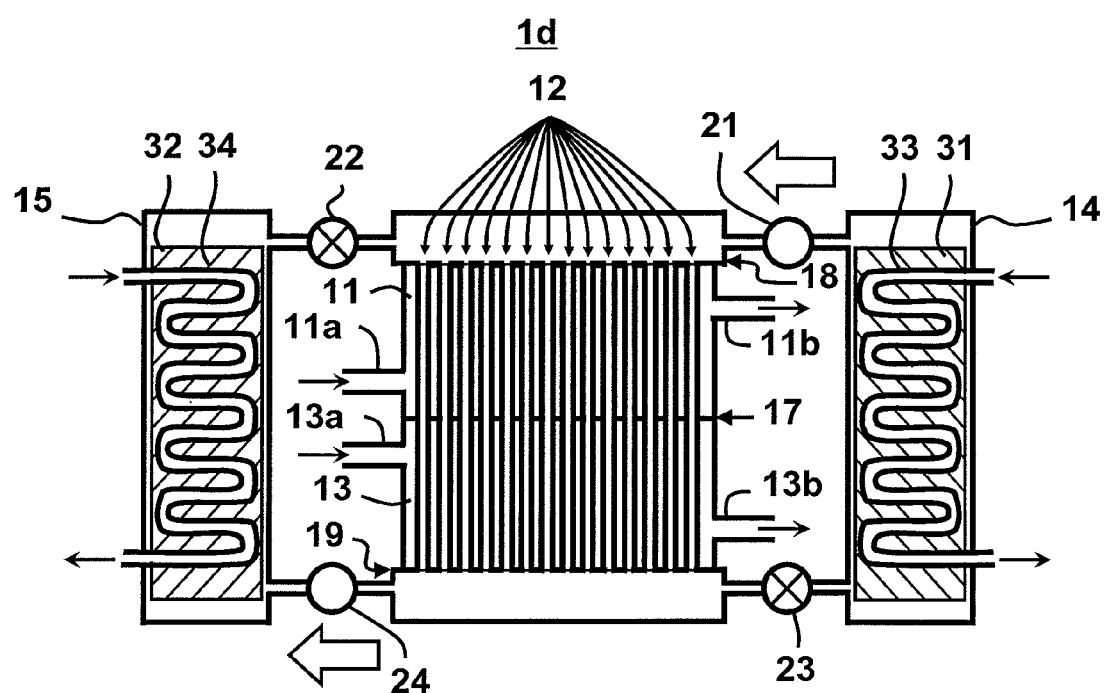
FIG. 9 is a schematic sectional view illustrating a heat pump of a third embodiment.

FIG. 9 is a schematic sectional view illustrating a heat pump 1d of a third embodiment. In the following description, the description of the same components as those of the heat pump 1b of the second embodiment will be omitted. In FIG. 9, there is a plurality of first flow paths 12. Each first flow path 12 is composed of a tubular member (hereinafter also referred to as tubular member 12). Both ends of each first flow path 12 are connected to the adsorbers 14 and 15.

The first heat exchanger 11 is a second flow path (hereinafter referred to as second flow path 11) provided in the space among the plurality of tubular members 12 in order to cause a third fluid at a temperature lower than the condensing point of the adsorbate to flow through it. A fourth fluid transfers cold energy generated at the end of the first flow path 12 to the outside. The second heat exchanger 13 is a third flow path (hereinafter referred to as third flow path 13) that is separated from the second flow path by a partition 17 and is provided in the space among the plurality of tubular members 12 in order to cause the fourth fluid to flow through it. The tubular members 12 are not separated by the partition 17, and the first heat exchanger 11 side and the second heat exchanger 13 side of each tubular member 12 communicate with each other.

Figure 10:
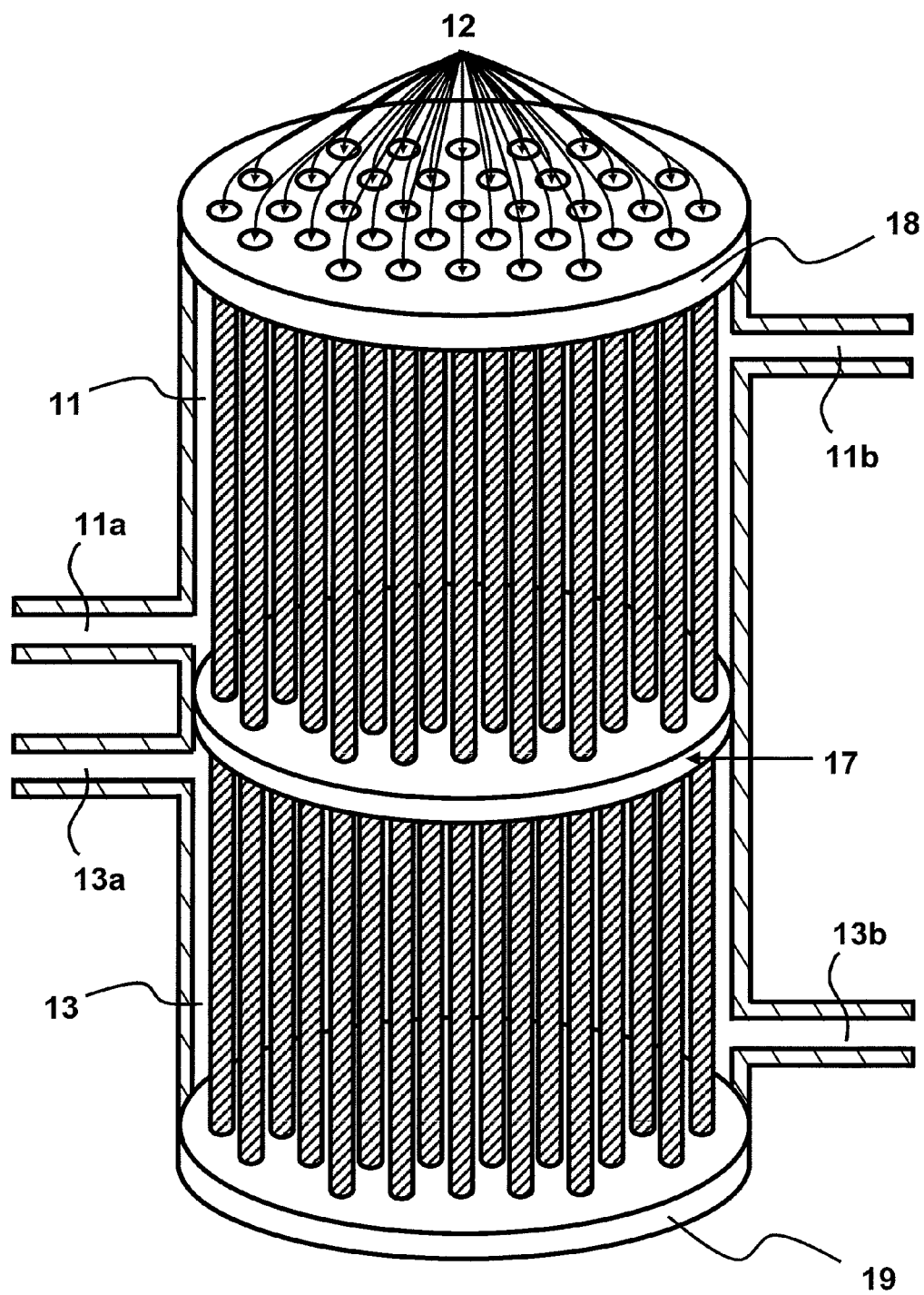
FIG. 10 is an enlarged perspective view of a part of the heat pump of the third embodiment.

FIG. 10 is an enlarged perspective view of the plurality of tubular members 12, the second flow path 11, and the third flow path 13 of the heat pump 1d of the third embodiment. In FIG. 10, a part of the outer wall of each of the second flow path 11 and the third flow path 13 is omitted. The third fluid at a temperature lower than the condensing point of the adsorbate flows into the second flow path 11 through an inlet 11a, and flows out of the second flow path 11 through an outlet 11b.

When the third fluid flows through the second flow path 11, the temperature of the inside of the plurality of tubular members 12 is maintained lower than the condensing point of the adsorbate. Adsorbate flowing from the adsorber 14 or 15 into the tubular members 12 undergoes a phase change from gas to liquid in the tubular members 12 and is held in the state of liquid in the tubular members 12.

As with the heat pump 1b of the second embodiment, in the heat pump 1d of the third embodiment capable of condensing adsorbate in the plurality of tubular members 12 as described above, a condensing chamber in which condensed adsorbate is accumulated is not independently provided between the adsorbers 14 and 15 and the first flow paths 12. Therefore, the size of the heat pump may be further reduced. Since the heat pump 1d of the third embodiment has more tubular members 12 than the heat pump 1b of the second embodiment, it may transfer more cold energy to the outside through the adsorbate held in the tubular members 12 and the second heat exchanger 13. The plurality of tubular members 12 are not provided with their respective second flow paths 11 for cooling them but provided with a single second flow path for cooling them. Therefore, when the number of tubular members 12 increases, the volume of the heat pump increases only slightly.

As with the heat pump of the first embodiment, the heat pump of the third embodiment may be formed by a general processing method. The partitions 18 and 19 may be formed, for example, by the following method. First, one end of a bundle of tubular members is placed in a cylindrical container, the space among the tubular members is filled with a filler of which a partition is made, and then the filler is hardened. When the tubular members are made of resin, the filler is a resin such as urethane resin. When the tubular members are made of metal, the filler is a low-melting-point metal such as solder. Next, by cutting the part fixed with the filler, a partition to which a plurality of tubular members is fixed may be formed.

Figure 11:
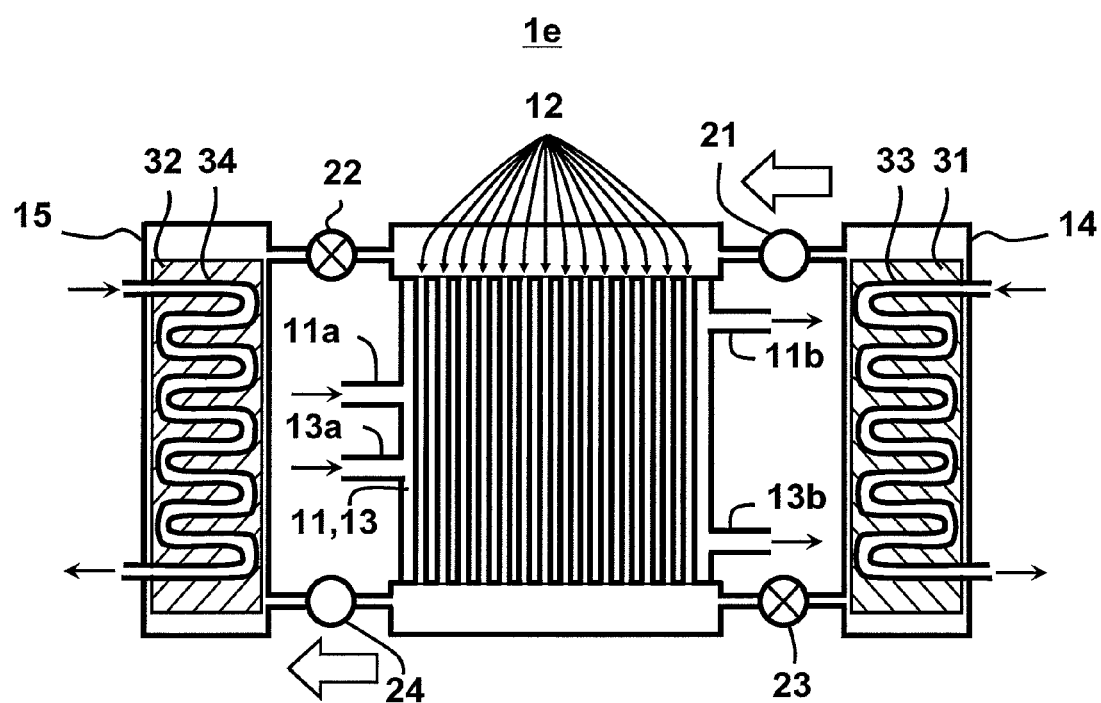
FIG. 11 is a schematic sectional view illustrating a modification of the heat pump of the third embodiment.

FIG. 11 is a schematic sectional view illustrating a heat pump 1e of a modification of the third embodiment. In the following description, the description of the same components as those of the heat pump 1d of the third embodiment will be omitted. In the heat pump 1e illustrated in FIG. 11, a partition is not provided between the first heat exchanger 11 and the second heat exchanger 13, and therefore the third fluid flowing through the second flow path 11 and the fourth fluid flowing through the second heat exchanger 13 are mixed. Therefore, the heat pump 1e illustrated in FIG. 11 is inferior to the heat pump 1d of the third embodiment illustrated in FIG. 9 in heat exchange efficiency but superior in that it may be reduced in size.

Figure 12:
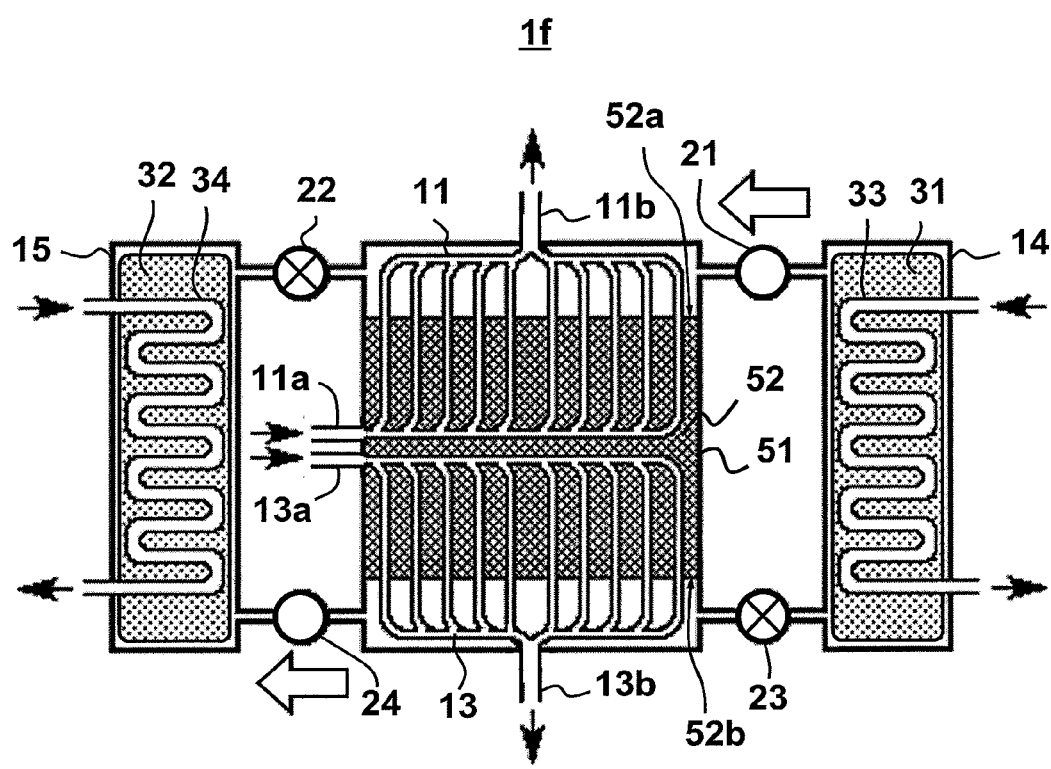
FIG. 12 is a schematic sectional view illustrating a heat pump of a fourth embodiment.

FIG. 12 is a schematic sectional view illustrating a heat pump 1f of a fourth embodiment. In the following description, the description of the same components as those of the heat pump 1d of the third embodiment will be omitted. The heat pump 1f of the fourth embodiment has a tubular member 51 filled with a porous body 52. Both ends of the tubular member 51 are connected to adsorbers 14 and 15. Pores in the porous body 52 are used as first flow paths. The pores extend through the porous body from the upper surface 52a thereof to the lower surface 52b thereof so that adsorbate may move from the first heat exchanger 11 side to the second heat exchanger 13 side. The pores of the porous body may be formed in any shape, and therefore countless first flow paths may be provided in the porous body 52. The porous body 52 may be formed, for example, of granulous metal or resin, spongy resin, fibrous glass, fibrous carbon, or the like.

In the porous body 52, a first heat exchanger 11 composed of tubules through which the third fluid may be caused to flow is buried at one end of the tubular member 51, and a second heat exchanger composed of tubules through which the fourth fluid may be caused to flow is buried at the other end of the tubular member 51. The first heat exchanger 11 has an inlet 11a through which the third fluid flows into the first heat exchanger 11 from the outside of the tubular member 51 and an outlet 11b through which the third fluid flows out of the first heat exchanger 11 to the outside of the tubular member 51. The second heat exchanger 13 has an inlet 13a through which the fourth fluid flows into the second heat exchanger 13 from the outside of the tubular member 51 and an outlet 13b through which the fourth fluid flows out of the second heat exchanger 13 to the outside of the tubular member 51. The insides of the first heat exchanger 11 and the second heat exchanger 13 composed of tubules are separated from the pores of the porous body used as first flow paths and do not communicate with them. It is preferable that the first heat exchanger 11 and the second heat exchanger 13 composed of tubules be formed of a highly heat-conductive material such as copper or aluminum in order to efficiently exchange heat, and be disposed at even intervals in the porous body 52. Examples of methods for burying the first heat exchanger composed of tubules in the porous body 52 include: a method including placing tubules in a container forming the tubular member 51 and filling the inside thereof with a continuous-pore foam (foam in which pores communicate with each other) such as polyethylene sponge; and a method including spraying resin containing glass fiber or carbon fiber to the space among the tubules.

Adsorbate sent from the adsorber 14 through the valve 21 flows into pores from the upper surface 52a of the porous body 52 closer to the valve 21 and is cooled by the first heat exchanger 11. Thus, the adsorbate may undergo a phase change from gas to liquid. Liquid adsorbate is held in the pores by capillary action. The held adsorbate evaporates from the lower surface 52b of the porous body 52 closer to the valve 24. The cold energy generated by evaporation is transferred to the outside by the second heat exchanger 13.

As with the heat pump 1d of the third embodiment, the heat pump 1f of the fourth embodiment may be reduced in size. Since the heat pump 1f has countless first flow paths composed of pores of a porous body, the heat exchange efficiency of the second heat exchanger is high. The porous body 52 is easier to form, handle, and process than a tubular member or tubular members that are used in the first to third embodiments and may hold adsorbate therein by capillary action. Since capillary action occurs owing to the pores of the porous body 52, the shape and size of the tubular member 51 may be set arbitrarily.

In the heat pump of the fourth embodiment, the second heat exchanger composed of tubules is preferably provided so as to pass through the end of the porous body closer to the adsorber that performs the adsorption process (the lower surface 52b of the porous body in FIG. 12) in order to efficiently exchange heat. The reason is that evaporation of adsorbate occurs in the vicinity of the end of the porous body. When the adsorbate is water, the surfaces of pores are preferably hydrophilic so as to easily hold water, and highly heat-conductive so as not to hinder heat exchange.

Figure 13:
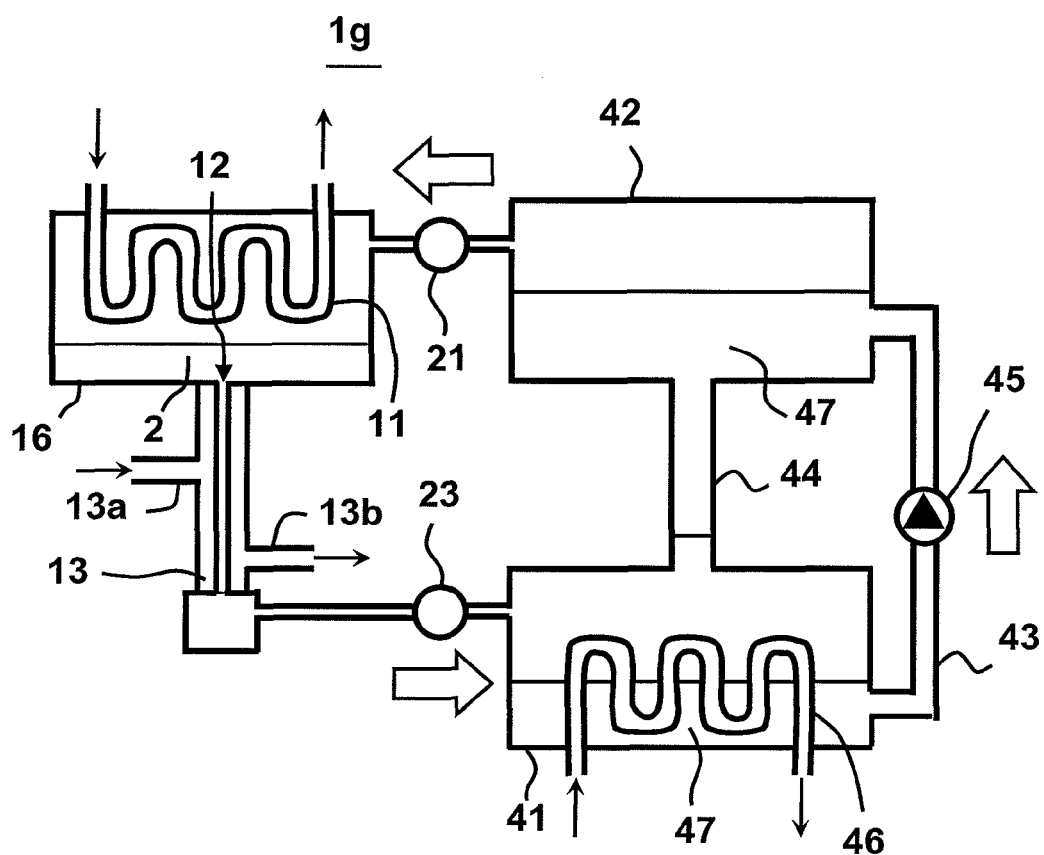
FIG. 13 is a schematic sectional view illustrating a heat pump of a fifth embodiment.

FIG. 13 is a schematic sectional view illustrating a heat pump 1g of a fifth embodiment. The heat pump 1g of the fifth embodiment is so-called absorption heat pump. An absorption heat pump uses, instead of the adsorbate and adsorbent, absorbing liquid capable of absorbing and releasing absorbate (refrigerant). In the following description, the description of the same components as those of the heat pump is of the first embodiment will be omitted.

The heat pump 1g illustrated in FIG. 13 includes a first heat exchanger 11 capable of condensing gaseous absorbate to liquid, a first flow path 12 that holds the absorbate condensed in the first heat exchanger 11 by capillary action, a second heat exchanger 13 that transfers cold energy from the first flow path 12, an absorber 41 connected to the end of the first flow path 12 farther from the first heat exchanger 11, and a regenerator 42 connected to the end of the first flow path 12 closer to the first heat exchanger 11.

Between the absorber 41 and the regenerator 42, flow paths 43 and 44 are provided. The flow path 43 is a flow path for sending absorbing liquid from the absorber 41 to the regenerator 42. In the flow path 43, a pump 45 is provided that sends absorbing liquid from the absorber 41 to the regenerator 42.

The flow path 44 is a flow path for sending absorbing liquid from the regenerator 42 to the absorber 41. In the flow path 44, a pump (not illustrated) is provided that sends absorbing liquid from the regenerator 42 to the absorber 41.

The first heat exchanger 11 is provided in a condensing chamber 16 provided between the first flow path 12 and the regenerator 42. Between the condensing chamber 16 and the regenerator 42, a valve 21 is provided. Between the first flow path 12 and the absorber 41, a valve 23 is provided.

The condensing chamber 16, the first flow path 12, and the absorber 41 have a hermetically-sealed space therein. When the absorption heat pump 1g is in use, this space is depressurized.

In the absorber 41 and the regenerator 42, absorbing liquid capable of absorbing absorbate is put. When the absorbate is water, lithium bromide (LiBr) water solution, for example, is used as absorbing liquid.

The absorber 41 is a container capable of holding absorbing liquid that absorbs absorbate in the atmosphere between the first flow path 12 and the absorber 41. Since the absorbing liquid put in the absorber 41 has the capability to absorb absorbate in the atmosphere, absorbate evaporates from the end of the first flow path 12, and cold energy is generated. As the absorbing liquid absorbs absorbate and its concentration decreases, the capability to absorb absorbate decreases. The absorbing liquid having a reduced absorbing capability is sent to the regenerator 42 by the pump 45. The absorber 41 has therein a heat exchanger composed of a tubular member 46. By causing fluid to flow through the tubular member 46, the heat generated when the absorbing liquid absorbs absorbate is transferred to the outside.

The regenerator 42 is a container for heating the absorbing liquid having a reduced capability to absorb absorbate. The regenerator 42 has a heating device that heats absorbing liquid. The absorbing liquid heated by the heating device releases gaseous absorbate into the atmosphere. For example, when heating lithium bromide water solution, the temperature rises to about 100° C. The released absorbate is condensed by the first heat exchanger 11. On the other hand, the absorbing liquid the concentration of which is increased by heating is returned to the absorber 41 through the flow path 44.

In this embodiment, a refrigerant holder corresponds to the combination of the absorber 41, the regenerator 42, and the flow paths 43 and 44.

As with the heat pump of the first embodiment, the heat pump 1g of the fifth embodiment may be reduced in size, and the heat exchange efficiency thereof may be improved.

As with the heat pump of the first embodiment, the heat pump of the fifth embodiment may be formed by a general processing method.

Figure 14:
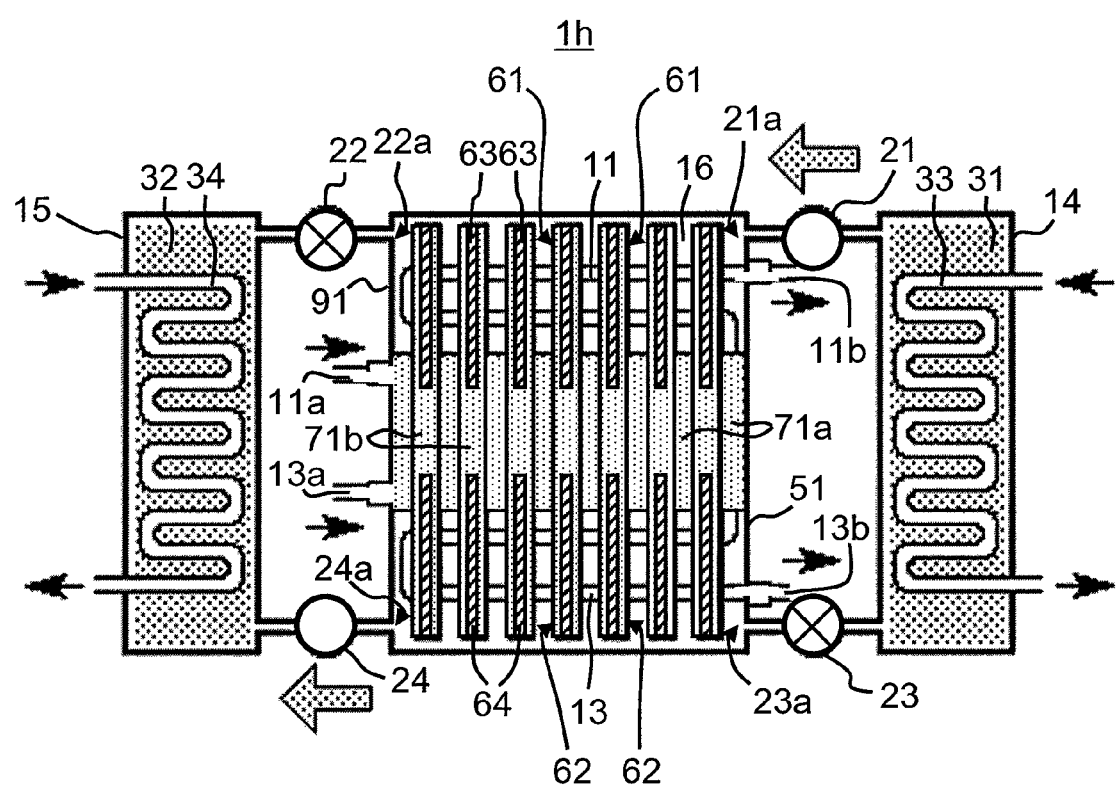
FIG. 14 is a schematic sectional view illustrating a heat pump of a sixth embodiment.

FIG. 14 is a schematic sectional view illustrating a heat pump 1h of a sixth embodiment. In the following description, the description of the same components as those of the heat pump 1f of the fourth embodiment will be omitted.

Both ends of the tubular member 51 are connected to both of the adsorbers 14 and 15. The tubular member 51 is filled with a porous body 71 (71a, 71b) formed of a porous material capable of holding water by capillary action. The porous body 71 filling the tubular member 51 has fin-like protrusions 61 and 62 in its upper portion and lower portion, respectively. The fin-like protrusions 61 and 62 of the porous body 71 increase the surface area per unit volume of the porous body 71. A tubular first heat exchanger 11 is in contact with the fin-like protrusions 61 of the porous body 71, and a tubular second heat exchanger 13 is in contact with the fin-like protrusions 62 of the porous body 71.

The porous body 71 includes, for example, plate-like or sheet-like porous bodies 71a and 71b. The size of the major surfaces of the porous bodies 71a is smaller than the size of the major surfaces of the porous bodies 71b. By alternately stacking the porous bodies 71a and the porous bodies 71b that are different in size, the fin-like protrusions 61 and 62 are formed.

The porous body 71 has countless pores therein. The pores extend through the porous body 71 at least from the upper part thereof to the lower part thereof so that adsorbate may move from the first heat exchanger 11 side to the second heat exchanger 13 side. The pores are used as first flow paths. The porous body 71 may be formed, for example, of granulous metal or resin, spongy resin, fibrous glass, fibrous carbon, or the like. It is preferable that the porous body 71 have a hydrophilic surface so as to easily hold water, and be highly heat-conductive so as not to hinder heat exchange.

The tubular first heat exchanger 11 in contact with the fin-like protrusions 61 cools the adsorbate flowing from the adsorber 14 through the valve 21 into the condensing chamber 16, thereby causing the adsorbate to undergo a phase change to liquid. Since the first heat exchanger 11 may exchange heat with the porous body 71 around it, the part of the porous body 71 in the vicinity of the first heat exchanger 11 functions as a heat exchanger. In the sixth embodiment, since the porous body 71 has fin-like protrusions 61, the surface area of the porous body 71 is large, and adsorbate may be suitably condensed. Since the fin-like protrusions 61 are in contact with the first heat exchanger 11, adsorbate may be more suitably condensed. Therefore, the heat pump of the sixth embodiment is high in the efficiency of energy conversion from thermal energy into cold energy.

The liquefied adsorbate is held by pores of the fin-like protrusions 61 of the porous body. The adsorbate serves to block the flow paths of the pores of the porous body 71 and moves downward by gravitational force and capillary action occurring in the pores.

The adsorbate held in the pores by capillary action vaporizes from the end of the porous body 71 opposite to the end closer to the first heat exchanger 11, thereby generating cold energy. The second heat exchanger 13 in contact with the fin-like protrusions 62 is provided in order to transfer the cold energy to the outside. In the sixth embodiment, since the porous body 71 has the fin-like protrusions 62, the surface area of the porous body 71 is large. For this reason, liquid adsorbate divides into minute regions and evaporates gently, and bumping does not occur. That is, since the process of phase change and heat exchange is performed in minute spaces, the efficiency of heat exchange between adsorbate and the second heat exchanger improves.

In addition, since the second heat exchanger 13 is disposed in contact with the fin-like protrusions 62, the cold energy generated by evaporation of adsorbate is quickly recovered by the buried second heat exchanger 13.

For the above reason, the adsorption heat pump of the sixth embodiment is high in the efficiency of energy conversion from thermal energy into cold energy.

It is preferable that heat transfer plates 63 in contact with the fin-like protrusions 61 of the porous body 71 and with the first heat exchanger 11 be provided. The heat transfer plates 63 are formed of a metal having high thermal conductivity, such as copper. As with the first heat exchanger in the heat pump 1f of the fourth embodiment (the first heat exchanger 11 in FIG. 12), the heat transfer plates 63 are provided in order to cause the gaseous adsorbate desorbed from the adsorbent to undergo a phase change to liquid. The heat taken by the heat transfer plates 63 is released to the outside by a heat transfer medium flowing in the first heat exchanger 11. By providing the heat transfer plates 63, the contact area between the gaseous adsorbate and the first heat exchanger increases substantially and therefore the efficiency of heat exchange between the adsorbate and the first heat exchanger 11 improves.

Heat transfer plates 64 in contact with the fin-like protrusions 62 of the porous body 71 and the second heat exchanger 13 may be provided. The heat transfer plates 64 are formed of a metal having high thermal conductivity, such as copper. The adsorbate held in the first flow paths (porous body 71) by capillary action vaporizes from the lower end of each first flow path, thereby generating cold energy. As with the second heat exchanger in the heat pump 1f of the fourth embodiment (the second heat exchanger 13 in FIG. 12), the heat transfer plates 64 are provided in order to transfer the cold energy to the outside. The heat taken by the heat transfer plates 64 is released to the outside by a heat transfer medium flowing in the second heat exchanger 13. Since the heat transfer plates 64 may heat the liquid adsorbate held in every corner of the porous body 71b, the efficiency of heat exchange between the adsorbate and the second heat exchanger 13 improves.

When the heat transfer plates 64 are covered by the porous body 71, the heat transfer plates 64 are always covered by the adsorbate held by the porous bodies 71b during the operation of the sixth embodiment, and the second heat exchanger 13 may efficiently recover the cold energy generated by evaporation from the heat transfer plates 64.

Figure 15A:
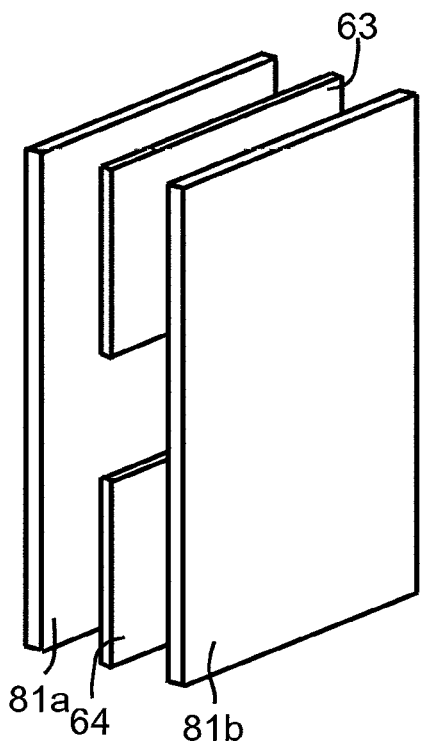
FIGS. 15A to 15C are schematic views illustrating a method for manufacturing the heat pump of the sixth embodiment.
Figure 15B:
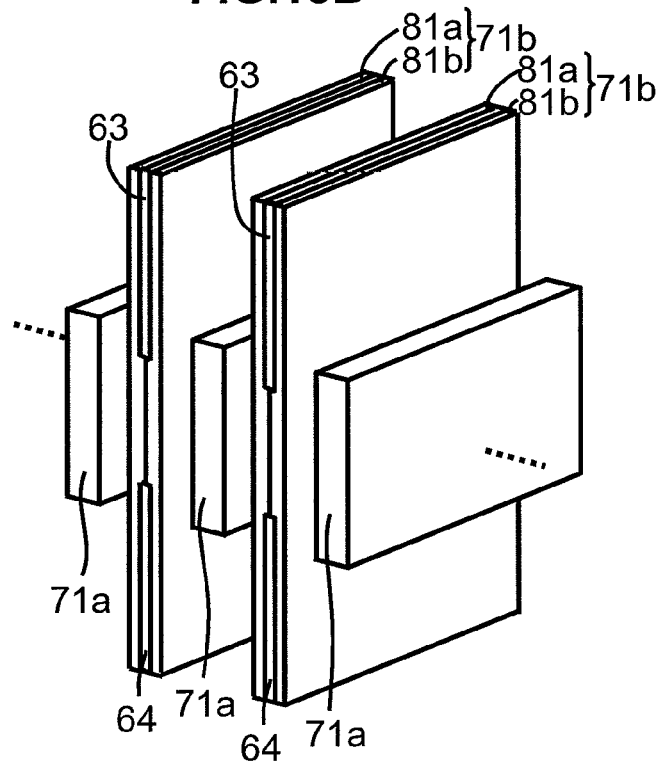
Figure 15C:
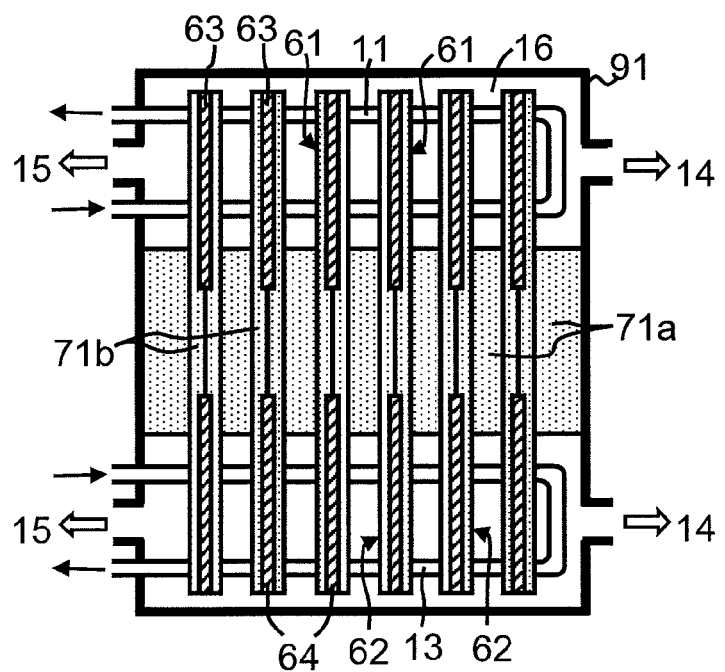

FIGS. 15A and 15B are perspective views of a component including a first heat exchanger, a porous body used as first flow paths, and a second heat exchanger provided in the adsorption heat pump of the sixth embodiment. FIG. 15C is a sectional view of a component including a first heat exchanger, a porous body used as first flow paths, and a second heat exchanger, in the adsorption heat pump of the sixth embodiment. With reference to FIGS. 15A to 15C, a method for manufacturing the adsorption heat pump of the sixth embodiment will be described.

First, as illustrated in FIG. 15A, heat transfer plates 63 and 64 are sandwiched between porous plates 81a and 81b so as to form a porous body 71b with the heat transfer plates 63 and 64 therein. The position in the porous body 71b where the heat transfer plate 63 is sandwiched between the porous plates 81a and 81b is the position where a first heat exchanger 11 to be disposed in a later step is in contact with the porous body 71b. The position in the porous body 71b where the heat transfer plate 64 is sandwiched between the porous plates 81a and 81b is the position where a second heat exchanger 13 to be disposed in a later step is in contact with the porous body 71b.

A pressure is applied to the porous plates 81a and 81b with the heat transfer plates 63 and 64 sandwiched there between, for example, with a pressing machine to integrate the porous plates 81a and 81b and the heat transfer plates 63 and 64. Thus, a porous body 71b is obtained.

Next, as illustrated in FIG. 15B, porous bodies 71b and porous bodies 71a are alternately stacked so as to form a porous body 71. The size of the major surfaces of the porous bodies 71a is smaller than the size of the major surfaces of the porous bodies 71b. By alternately stacking the porous bodies 71a and the porous bodies 71b that are different in size, a porous body having fin-like protrusions 61 and 62 may be obtained.

Next, as illustrated in FIG. 15C, through-holes are formed using a drill or the like in the direction normal to the major surfaces of the porous body 71 in which the heat transfer plates 63 are buried, and a metal tube is passed through the through-holes as a first heat exchanger 11. In addition, through-holes are formed in the direction normal to the major surfaces of the porous body 71 in which the heat transfer plates 64 are buried and a metal tube is passed through the through-holes as a second heat exchanger 13. After that, the porous body 71 provided with the metal tubes is placed in a square tubular container 91. The metal tube 11 is in contact with the porous bodies 71a or 71b and the heat transfer plates 63 or 64. In order to fasten together the metal tube 11, the porous bodies 71a or 71b, and the heat transfer plates 63 or 64, they may be bonded together by pressure bonding or using an adhesive or a jig.

In order to efficiently exchange heat with the adsorbate in the pores of the porous body, the porous plates 81a and 81b are preferably thin. For example, when the major surfaces of the porous plates are 120 mm square, the thickness thereof is preferably 0.5 mm. The size of the fin-like protrusions 61 and 62 is, for example, about 30 mm to 50 mm.

According to the above-described method for manufacturing the adsorption heat pump of the sixth embodiment, a tubular first heat exchanger 11 may be easily disposed around the pores of the porous body used as first flow paths capable of holding adsorbate therein by capillary action. For example, metal tubes serving as a first heat exchanger 11 may be easily disposed at regular intervals with respect to the major surfaces of the fin-like protrusions 61, and metal tubes serving as a second heat exchanger 13 may be easily disposed at regular intervals with respect to the major surfaces of the fin-like protrusions 62. Therefore, when the obtained adsorption heat pump is in operation, the efficiency of heat exchange between the adsorbate and the first heat exchanger 11 and the second heat exchanger 13 may be improved. It is preferable that heat transfer plates be buried in the fin-like protrusions 61 and 62. In this case, when the obtained adsorption heat pump is in operation, the efficiency of heat exchange between the adsorbate and the first heat exchanger 11 and the second heat exchanger 13 may be further improved.

An example of the sixth embodiment will be described below.

Commercially available porous plates made of polyester fiber (Unitika Ltd., "Univeks SB") were prepared. Twenty long plates (80 mm by 40 mm and 0.5 mm thick) and nine short plates (30 mm by 40 mm and 2 mm thick) were prepared. Two aluminum sheets (25 mm by 40 mm and 0.2 mm thick) for heat transfer were prepared. Two aluminum sheets were sandwiched between two long porous plates in such a manner that one aluminum sheet was located at each end of the long porous plates, and they were fastened together with a jig. Ten sets of long porous plates with aluminum sheets sandwiched there between and nine short porous plates were alternately stacked so as to form a porous plate unit having a fin-like structure measuring 25 mm by 40 mm at each end thereof.

Thirty milliliters of water was absorbed from the fin-like structure at one end of the porous plate unit. The end and the sides of the porous plate unit were hermetically-sealed, and then the porous plate unit was placed in a depressurized container with the fin-like structure at the other end facing downward. As a result, water absorbed by the porous body was held in the porous plate unit so as to prevent the airflow between the fin-like structures at both ends of the porous plate unit. It was confirmed that under a depressurized atmosphere, evaporation occurred from the lower fin-like structure of the porous plate unit covered with a vinyl container. It was observed that the temperature of the surface of the lower fin-like structure decreased by about 6° C. It was confirmed that the lower fin-like structure of the porous plate unit is excellent as the shape of a porous structure disposed around the second heat exchanger.

Figure 16A:
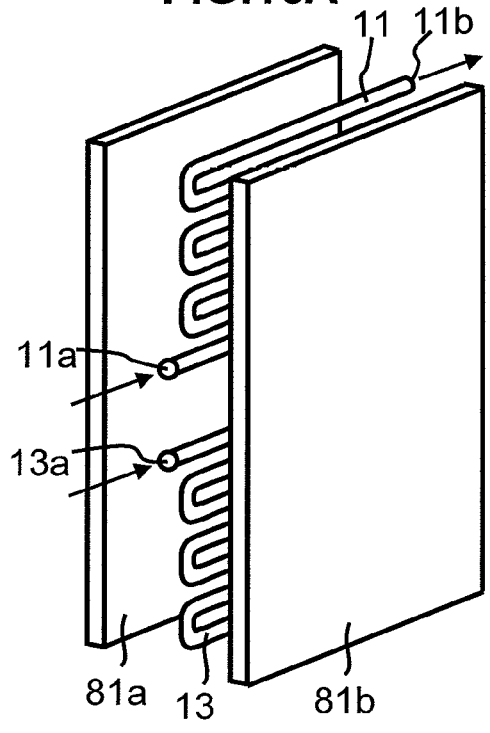
FIGS. 16A to 16C are schematic views illustrating a heat pump of a seventh embodiment and a method for manufacturing it.
Figure 16B:
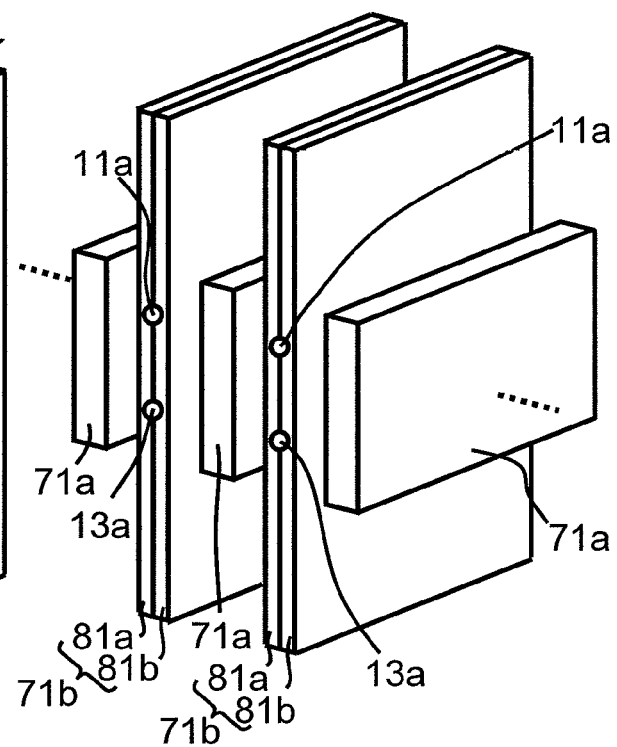
Figure 16C:
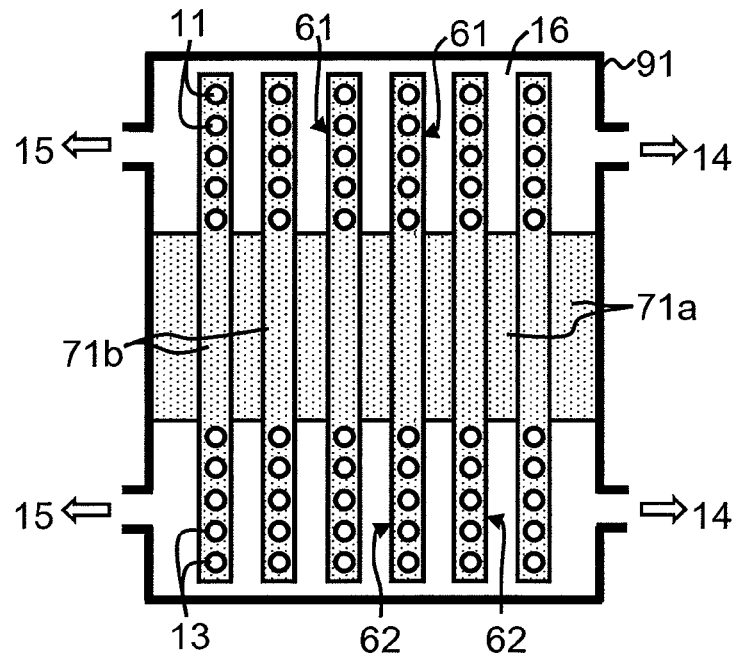

FIGS. 16A and 16B are perspective views of a porous unit including a first heat exchanger, a porous body used as a first flow path, and a second heat exchanger provided in an adsorption heat pump 1i of a seventh embodiment. FIG. 16C is a sectional view of a component including a first heat exchanger, a porous body used as a first flow path, and a second heat exchanger, in the adsorption heat pump 1i of the seventh embodiment. With reference to FIGS. 16A to 16C, the adsorption heat pump 1i of the seventh embodiment will be described. In the following description, the description of the same components as those of the heat pump 1h of the sixth embodiment will be omitted.

In the above-described adsorption heat pump 1h of the sixth embodiment, a tubular first heat exchanger 11 penetrates porous bodies 71b that are disposed in a square tubular container 91 and in which heat transfer plates 63 and 64 are buried. In the adsorption heat pump 1i of the seventh embodiment, instead of heat transfer plates 63 and 64, a first heat exchanger 11 and a second heat exchanger 13 are buried in a porous body 71b. The tubular first heat exchanger 11 and second heat exchanger 13 are disposed substantially parallel to the major surfaces of the porous body 71b. Since the first heat exchanger 11 and the second heat exchanger 13 provided in every corner of the porous body 71b may easily exchange heat with liquid adsorbate held in every corner of the porous body 71b, the efficiency of heat exchange between the adsorbate and the second heat exchanger 13 improves.

With reference to FIGS. 16A to 16C, a method for manufacturing the adsorption heat pump of the seventh embodiment will be described. In the following description, the description of the same steps as those of the method for manufacturing the heat pump 1h of the sixth embodiment will be omitted.

First, as illustrated in FIG. 16A, a first heat exchanger 11 and a second heat exchanger 13 are sandwiched between porous plates 81a and 81b so as to form a porous body 71b with the first heat exchanger 11 and the second heat exchanger 13 therein.

A pressure is applied to the porous plates 81a and 81b with the first heat exchanger 11 and the second heat exchanger 13 sandwiched there between, for example, with a pressing machine to integrate the porous plates 81a and 81b and the first heat exchanger 11 and the second heat exchanger 13. Thus, a porous body 71b is obtained.

Next, as illustrated in FIG. 16B, porous bodies 71b and porous bodies 71a are alternately stacked so as to form a porous body 71. The size of the major surfaces of the porous bodies 71a is smaller than the size of the major surfaces of the porous bodies 71b. By alternately stacking the porous bodies 71a and the porous bodies 71b that are different in size, a porous body having fin-like protrusions 61 and 62 may be obtained.

Next, as illustrated in FIG. 16C, the porous body 71 provided with the metal tubes is placed in a square tubular container 91. The metal tube 11 is in contact with the porous bodies 71a or 71b. In order to fasten together the metal tube 11, the porous bodies 71a or 71b, they may be bonded together by pressure bonding or using an adhesive or a jig.

According to the above-described method for manufacturing the adsorption heat pump of the seventh embodiment, a tubular first heat exchanger 11 and a tubular second heat exchanger 13 may be easily disposed around the pores of the porous body used as first flow paths capable of holding adsorbate therein by capillary action. For example, metal tubes serving as a first heat exchanger 11 may be easily buried at regular intervals parallel to the major surfaces of the fin-like protrusions 61, and metal tubes serving as a second heat exchanger 13 may be easily buried at regular intervals with respect to the major surfaces of the fin-like protrusions 62. Therefore, when the obtained adsorption heat pump is in operation, the efficiency of heat exchange between the adsorbate and the first heat exchanger 11 and the second heat exchanger 13 may be improved.

Figure 17A:
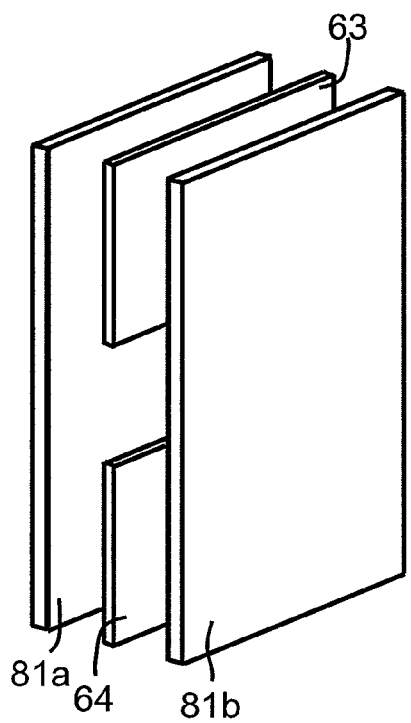
FIGS. 17A to 17C are schematic views illustrating a heat pump of an eighth embodiment and a method for manufacturing it.
Figure 17B:
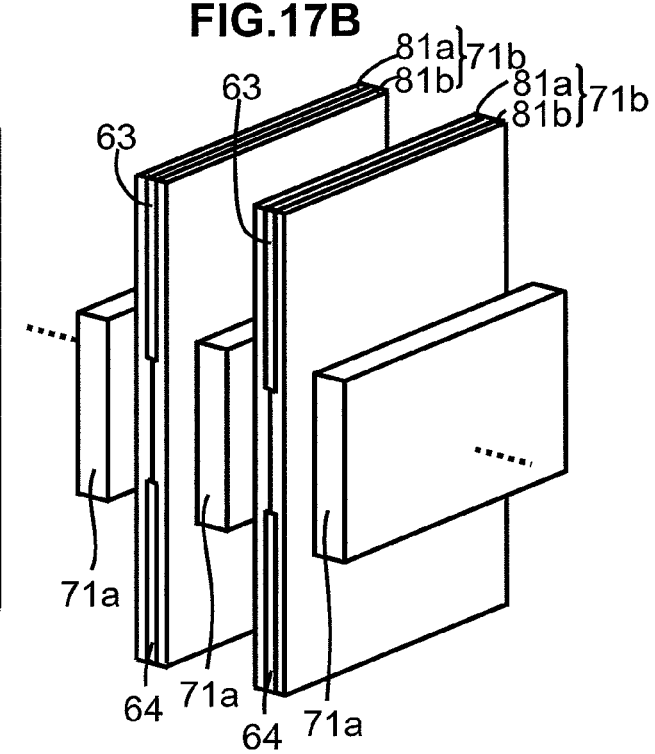
Figure 17C:
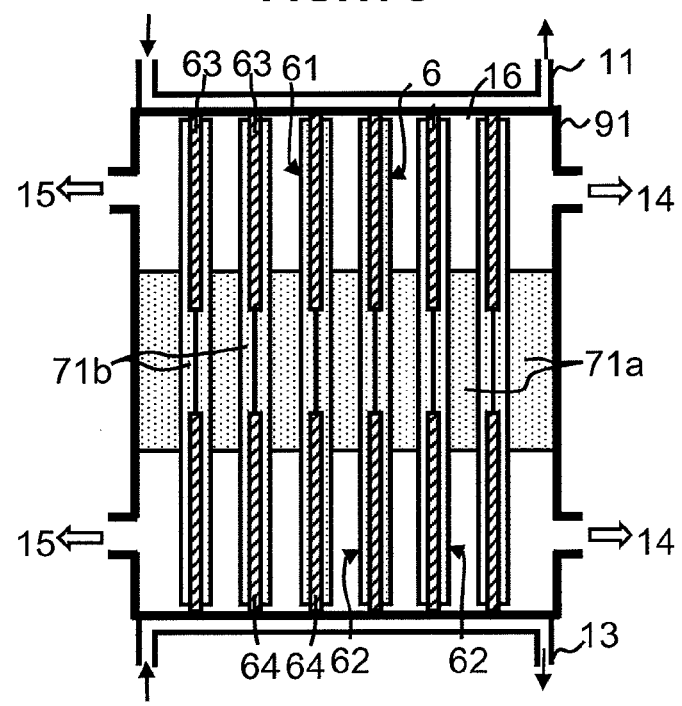

FIGS. 17A and 17B are perspective views of a porous unit including a first heat exchanger, a porous body used as a first flow path, and a second heat exchanger provided in an adsorption heat pump $1j$ of an eighth embodiment. FIG. 17C is a sectional view of a component including a first heat exchanger, a porous body used as a first flow path, and a second heat exchanger, in the adsorption heat pump $1j$ of the eighth embodiment. With reference to FIGS. 17A to 17C, the adsorption heat pump $1j$ of the eighth embodiment and a method for manufacturing it will be described. In the following description, the description of the same components and manufacturing steps as those of the heat pump $1h$ of the sixth embodiment will be omitted.

In the above-described adsorption heat pump $1h$ of the sixth embodiment, a tubular first heat exchanger 11 penetrates porous bodies 71$b$ that are disposed in a square tubular container 91 and in which heat transfer plates 63 and 64 are buried. In the adsorption heat pump $1j$ of the eighth embodiment, the ends of the heat transfer plates 63 and 64 are in contact with a square tubular container 91. A first heat exchanger 11 is provided on the surface of the container 91 opposite to the surface in contact with the ends of the heat transfer plates 63. When the adsorption heat pump $1j$ is in operation, the heat transfer plates 63 exchange heat with the adsorbate in the porous bodies 71$b$. The heat absorbed by the heat transfer plates 63 is released from the container 91 and the first heat exchanger 11 to the outside. The heat transfer plates 63 exchange heat with gaseous adsorbate in the pores of the porous body 71. For example, compared to a case where a tubular first heat exchanger 11 is buried in a porous body 71, the contact area with the gaseous adsorbate in the porous body 71 is large, and therefore the efficiency of heat exchange between the adsorbate and the first heat exchanger 11 is high.

When the adsorption heat pump $1j$ is in operation, the heat transfer plates 64 exchange heat with the adsorbate in the porous bodies 71$b$. The cold energy absorbed by the heat transfer plates 64 is released through the container 91 and the second heat exchanger 13 to the outside. When the adsorption heat pump $1j$ is in operation, the heat transfer plates 64 exchange heat with the gaseous adsorbate in the pores of the porous body 71. Since the heat transfer plates 64 may easily exchange heat with the liquid adsorbate held in every corner of the porous bodies 71$b$, the efficiency of heat exchange between the adsorbate and the second heat exchanger 13 is high.

With reference to FIGS. 17A to 17C, a method for manufacturing the adsorption heat pump $1j$ of the eighth embodiment will be described. In the following description, the description of the same steps as those of the method for manufacturing the heat pump $1h$ of the sixth embodiment will be omitted.

First, as illustrated in FIG. 17A, heat transfer plates 63 and 64 are sandwiched between porous plates 81$a$ and 81$b$ so as to form a porous body 71$b$ with the heat transfer plates 63 and 64 therein. The manufacturing method of this embodiment differs from the manufacturing method of the sixth embodiment in that the porous bodies 71$b$ are formed in such shape and size that when the porous bodies 71$b$ are disposed in a square tubular container 91 in a later step, the heat transfer plates 63 and 64 are in contact with the container 91. For this reason, the ends of the metal plates 63 and 64 are exposed.

Next, as illustrated in FIG. 17B, porous bodies 71$b$ and porous bodies 71$a$ are alternately stacked so as to form a porous body 71. By alternately stacking the porous bodies 71$a$ and the porous bodies 71$b$ that are different in size, a porous body having fin-like protrusions 61 and 62 may be obtained.

Next, as illustrated in FIG. 17C, the porous body 71 having fin-like protrusions 61 and 62 is placed in a square tubular container 91 made of a highly heat-conductive metal or the like. The heat transfer plates 63 and 64 placed in the container 91 are in contact with the container 91. A first heat exchanger 11 is provided in the vicinity of the part of the container 91 with which the heat transfer plates 63 are in contact, and a second heat exchanger 13 is provided in the vicinity of the part of the container 91 with which the heat transfer plates 64 are in contact.

According to the above-described method for manufacturing the adsorption heat pump of the eighth embodiment, heat transfer plates functioning as a first heat exchanger 11 may be easily disposed around the pores of the porous body used as first flow paths capable of holding adsorbate therein by capillary action. Since heat transfer plates are buried in the fin-like protrusions 61, the efficiency of heat exchange between adsorbate and heat transfer plates 63 and 64 functioning as a part of the first heat exchanger 11 and a part of the second heat exchanger 13, respectively, may be improved when the obtained adsorption heat pump is in operation.

According to the above-described embodiments, the size of heat pump may be reduced, and the efficiency of heat exchange may be improved. The heat pumps of the above-described embodiments may be widely mounted in small- and medium-sized machines that generate low-temperature waste heat, such as automobiles and computers. As a result, advantageous effects such as energy conservation by the use of waste heat and reduction of environmental burden may be expected.

The present invention is not limited to the above-described embodiments. The above-described embodiments are illustrative only, and any heat pump that has substantially the same configuration as the technical idea described in the claims of the present invention and that achieves similar advantageous effects is included in the technical scope of the present invention.

In the above-described first to third embodiments, instead of the adsorbents 31 and 32, a material may be used that reacts chemically with a refrigerant to form a reactant and thereby accumulates the refrigerant, and releases the refrigerant when the reactant is heated. Such a material is, for example, calcium oxide (CaO) when the refrigerant is water. Calcium oxide undergoes hydration reaction to produce calcium hydroxide ($Ca(OH)_2$). When heated, calcium hydroxide undergoes dehydration reaction to produce calcium oxide. The heat generated by the hydration reaction may also be used as warm heat. A heat pump using the reversible reaction between a refrigerant and a chemical is generally called "chemical heat pump."

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A heat pump comprising:
   a refrigerant accumulator in which a substance accumulating a refrigerant is disposed, the refrigerant accumulator having a heating means heating the substance in order to release the refrigerant;
   a flow path connected at one end thereof to the refrigerant accumulator, the flow path holding the refrigerant released from the substance in the refrigerant accumulator by capillary action, the refrigerant in the flow path being in a liquid phase;
   a first heat exchanger provided between the refrigerant accumulator and the flow path or around the flow path and exchanging heat with the refrigerant in order to condense the refrigerant; and a second heat exchanger provided around the flow path and exchanging cold energy generated by evaporation of the refrigerant from the other end of the flow path.

2. The heat pump according to claim 1, wherein the flow path comprises a tubular member.

3. The heat pump according to claim 1, wherein the first heat exchanger is provided around the flow path so that the refrigerant condenses in the flow path.

4. The heat pump according to claim 1, wherein the flow path is formed with a porous component.

5. The heat pump according to claim 4, wherein the second heat exchanger includes a tubular member penetrating through the porous component.

6. The heat pump according to claim 4, wherein the first heat exchanger includes a tubular member penetrating the porous component.

7. The heat pump according to claim 4, wherein a fin-like protrusion is provided at one end of the porous component.

8. The heat pump according to claim 7, wherein the first heat exchanger is in contact with the fin-like protrusion.

9. The heat pump according to claim 7, wherein the second heat exchanger is in contact with the fin-like protrusion.

* * * * *